US012769958B1

(12) United States Patent
Woolven et al.

(10) Patent No.: US 12,769,958 B1
(45) Date of Patent: Oct. 20, 2026

(54) SYSTEMS AND METHODS FOR MULTILINGUAL LITERATURE PROCESSING AND ARRANGEMENT ON A USER INTERFACE

(71) Applicant: Veeva Systems Inc., Pleasanton, CA (US)

(72) Inventors: Eric Mitchell Woolven, Toronto (CA); Marius K. Mortensen, Burlington (CA)

(73) Assignee: Veeva Systems Inc., Pleasanton, CA (US)

( * ) Notice: Subject to any disclaimer, the term of this patent is extended or adjusted under 35 U.S.C. 154(b) by 128 days.

(21) Appl. No.: 18/795,319

(22) Filed: Aug. 6, 2024

Related U.S. Application Data

(60) Provisional application No. 63/517,995, filed on Aug. 7, 2023.

(51) Int. Cl.
*G06F 40/58* (2020.01)
*G06F 9/451* (2018.01)
*G06F 40/279* (2020.01)

(52) U.S. Cl.
CPC .............. *G06F 40/58* (2020.01); *G06F 9/454* (2018.02); *G06F 40/279* (2020.01)

(58) Field of Classification Search
CPC ......... G06F 40/58; G16H 70/40; G16H 20/10
See application file for complete search history.

(56) References Cited

U.S. PATENT DOCUMENTS

| | | | | |
|---|---|---|---|---|
| 2008/0294455 | A1* | 11/2008 | Bharara | G16H 40/67 705/2 |
| 2010/0179821 | A1* | 7/2010 | Gedeon | G16H 20/10 705/2 |
| 2015/0106123 | A1* | 4/2015 | Amarasingham | G16H 10/60 705/3 |
| 2016/0110523 | A1* | 4/2016 | Francois | G16H 10/20 705/2 |

OTHER PUBLICATIONS

Salas, Maribel, et al. "The use of artificial intelligence in pharmacovigilance: a systematic review of the literature." Pharmaceutical medicine 36.5 (2022): 295-306. (Year: 2022).*

(Continued)

*Primary Examiner* — Jialong He

(57) ABSTRACT

A method for multilingual data processing includes receiving an intake threshold and at least one case intake preference. The method includes receiving a digital file associated with a piece of digital literature and including a linguistic section in a first language. The method further includes translating the linguistic section from the first language to a second language. The method further includes determining one or more key terms of the translated linguistic section. The method further includes determining the linguistic section fulfills the intake threshold based on the requisite preference and the one or more key terms. The method further includes determining, in response to the key terms of the linguistic section fulfilling the intake threshold, adverse event data based on the one or more key terms. The method further includes generating a case dataset including at least a portion of the adverse event data and outputting the case dataset.

20 Claims, 7 Drawing Sheets

(56) References Cited

OTHER PUBLICATIONS

Murphy, Rachel M., et al. "Adverse drug event detection using natural language processing: A scoping review of supervised learning methods." Plos one 18.1 (Jan. 2023) (Year: 2023).*

Härkänen, Marja, et al. "Artificial intelligence for identifying the prevention of medication incidents causing serious or moderate harm: an analysis using incident reporters' views." International journal of environmental research and public health 18.17 (2021): 9206. (Year: 2021).*

* cited by examiner

400

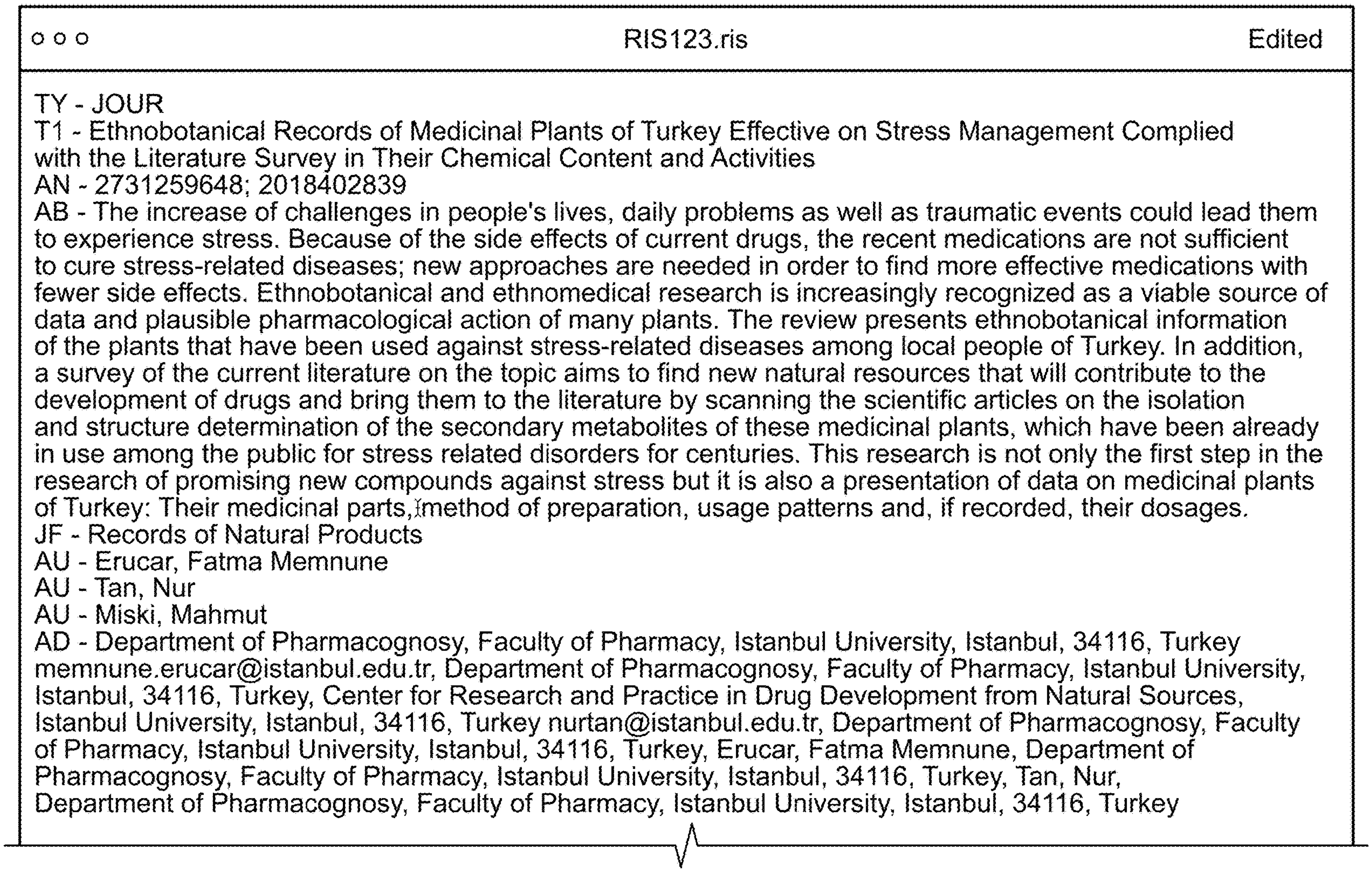

○ ○ ○ RIS123.ris Edited

TY - JOUR
T1 - Ethnobotanical Records of Medicinal Plants of Turkey Effective on Stress Management Complied with the Literature Survey in Their Chemical Content and Activities
AN - 2731259648; 2018402839
AB - The increase of challenges in people's lives, daily problems as well as traumatic events could lead them to experience stress. Because of the side effects of current drugs, the recent medications are not sufficient to cure stress-related diseases; new approaches are needed in order to find more effective medications with fewer side effects. Ethnobotanical and ethnomedical research is increasingly recognized as a viable source of data and plausible pharmacological action of many plants. The review presents ethnobotanical information of the plants that have been used against stress-related diseases among local people of Turkey. In addition, a survey of the current literature on the topic aims to find new natural resources that will contribute to the development of drugs and bring them to the literature by scanning the scientific articles on the isolation and structure determination of the secondary metabolites of these medicinal plants, which have been already in use among the public for stress related disorders for centuries. This research is not only the first step in the research of promising new compounds against stress but it is also a presentation of data on medicinal plants of Turkey: Their medicinal parts, method of preparation, usage patterns and, if recorded, their dosages.
JF - Records of Natural Products
AU - Erucar, Fatma Memnune
AU - Tan, Nur
AU - Miski, Mahmut
AD - Department of Pharmacognosy, Faculty of Pharmacy, Istanbul University, Istanbul, 34116, Turkey memnune.erucar@istanbul.edu.tr, Department of Pharmacognosy, Faculty of Pharmacy, Istanbul University, Istanbul, 34116, Turkey, Center for Research and Practice in Drug Development from Natural Sources, Istanbul University, Istanbul, 34116, Turkey nurtan@istanbul.edu.tr, Department of Pharmacognosy, Faculty of Pharmacy, Istanbul University, Istanbul, 34116, Turkey, Erucar, Fatma Memnune, Department of Pharmacognosy, Faculty of Pharmacy, Istanbul University, Istanbul, 34116, Turkey, Tan, Nur, Department of Pharmacognosy, Faculty of Pharmacy, Istanbul University, Istanbul, 34116, Turkey

FIG. 4A

Y1 - 2023///Jan 2023 - Feb
PY - 2023
DA - Jan 2023 - Feb 2023
SP - 1
EP - 92
PB - ACG Publications
VL - 17
IS - 1
KW - ethnobotanical
KW - herbal drugs
KW - Stress
KW - Embase
KW - herbaceous agent
KW - Turkey (republic)
KW - drug mechanism
KW - medicinal plant
KW - nonhuman
KW - stress management
KW - human
KW - article
KW -natural resource
M3 - Article
UR - https://internalLitRepository.pharma123.com
L2 - https://internalLitRepositorybackup.pharma123.com

FIG. 4B

SYSTEMS AND METHODS FOR MULTILINGUAL LITERATURE PROCESSING AND ARRANGEMENT ON A USER INTERFACE

CROSS REFERENCE TO RELATED APPLICATIONS

This application claims priority to U.S. Provisional Patent Application No. 63/517,995, filed Aug. 7, 2023, which is incorporated herein by reference in its entirety.

TECHNICAL FIELD

The present disclosure relates to systems and methods for multilingual literature processing and arrangement on a user interface.

BACKGROUND

Researchers, scientists, industry players, academics, government regulators, and other stakeholders are increasingly in need of efficient and intuitive ways to intake literature and arrange the literature on a user interface.

SUMMARY

One embodiment relates to a method for multilingual data processing. The method includes receiving an intake threshold and at least one case intake preference including a requisite preference. The method further includes receiving a digital file associated with a piece of digital literature and including a linguistic section in a first language. The method further includes translating the linguistic section from the first language to a second language. The method further includes determining one or more key terms of the translated linguistic section. The one or more key terms are in the second language. The method further includes determining the linguistic section fulfills the intake threshold based on the requisite preference and the one or more key terms. The method further includes determining, in response to the key terms of the linguistic section fulfilling the intake threshold, adverse event data based on the one or more key terms. The method further includes generating a case dataset including at least a portion of the adverse event data and outputting the case dataset.

Another embodiment relates to a method for multilingual data processing. The method includes receiving a digital file associated with a first piece of digital literature and a second piece of digital literature. The digital file includes a first linguistic section in a first language associated with the first piece of digital literature and a second linguistic section in a second language associated with the second piece of digital literature. The digital file is a research information system (RIS) file. The method further includes translating the first linguistic section from the first language to a second language. The method further includes translating the second linguistic section from the first language to a second language. The method further includes determining one or more first key terms of the first linguistic section. The one or more first key terms are in the second language. The method further includes determining one or more second key terms of the second linguistic section. The one or more second key terms are in the second language. The method further includes determining the linguistic section fulfills the intake threshold based on the requisite preference and the one or more key terms. The method further includes ranking the first piece of digital literature based on the one or more first key terms as a first rank. The method further includes ranking the second piece of digital literature based on the one or more second key terms as a second rank. The first rank is higher than the second rank. The method further includes determining, in response to the first rank being higher than the second rank, adverse event data based on the one or more first key terms. The method further includes generating a case dataset including at least a portion of the adverse event data and outputting the case dataset.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

FIGS. 4A-4B may be illustrations of some aspects of an digital literature file received and processed by the digital literature management system of FIG. 1, according to an example embodiment.

DETAILED DESCRIPTION

Figure 1:
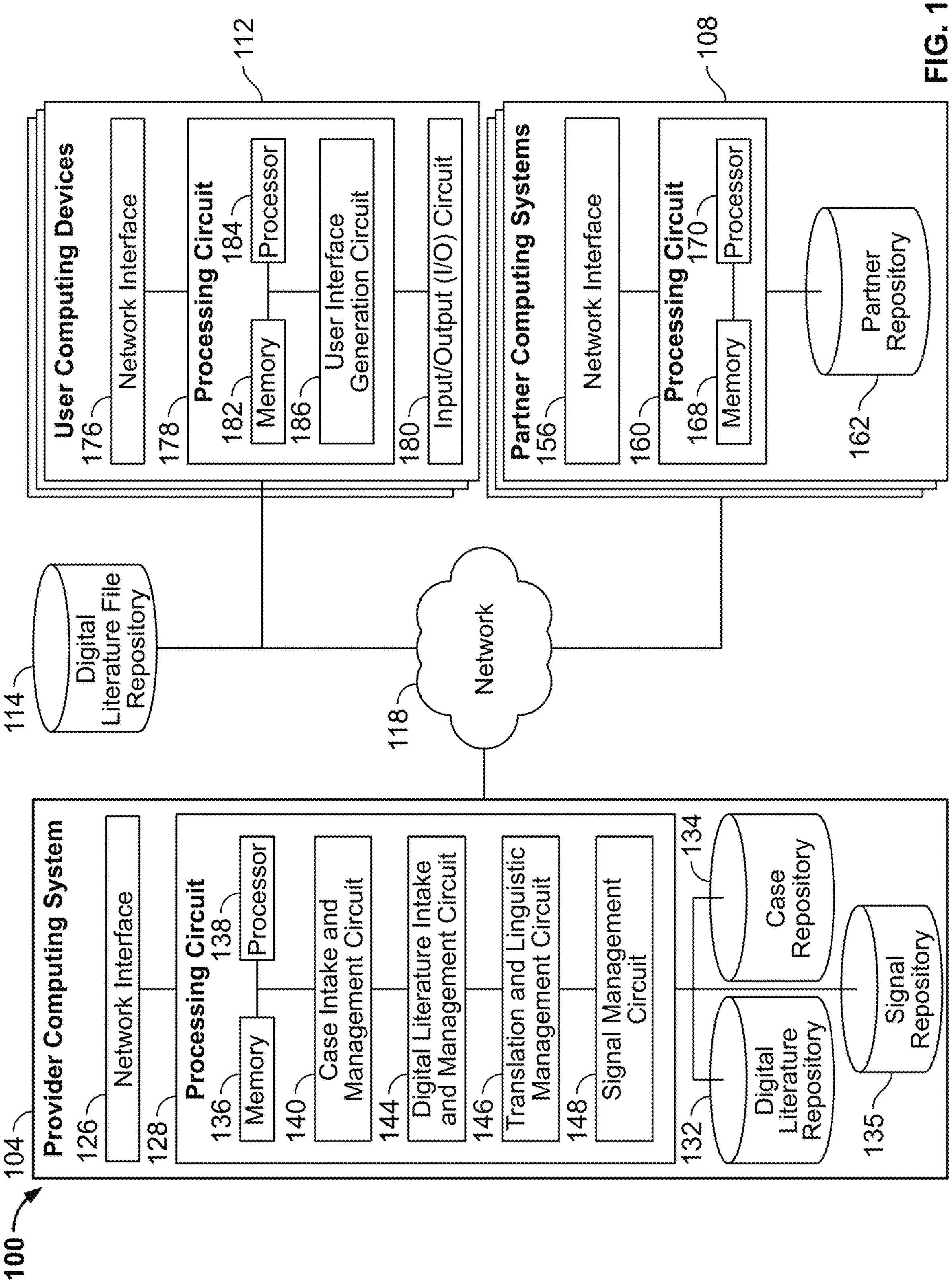
FIG. 1 may be a component diagram of a digital literature management system, according to an example embodiment.

Referring generally to the figures, systems and methods for multilingual literature processing and arrangement on a user interface are shown. The systems and methods described herein provide for improved multilingual literature intake and processing, and thereby help the pharmaceutical industry by shortening the time required for literature representing an adverse event and/or a potential signal, received in any language, to be intaken and reported to the correct health authorities. For example, the systems and methods described herein provide for multilingual intake of a bulk literature file including multilingual linguistic sections in potentially multiple languages (e.g., Chinese, Russian, English, Arabic). Further, the systems and methods provide for the generation of case datasets or potential signals based on multilingual linguistic sections of the literature file in comparison to typical digital document processing. For example, the systems and methods described herein may receive linguistic sections of the literature file in a first language, a second language, and a third language. Then, the systems and methods may translate the second language and the third language to the first language and generate a case or signal data object based on the translated portions of the linguistic sections. By doing so, the systems and methods described herein may significantly speed up digital literature intake and submission of case datasets and use less processing power and memory, than is typical. For example, by generating the case dataset based on the translated linguistic section, the systems and methods described herein may not require external translation and processing of the digital literature, thereby requiring less duplication and outputting of the digital literature which saves on processing power (for outputting the digital literature) and network bandwidth (to transmit the digital literature).

Additionally, the systems and methods described herein provide for an improved and simplified user interface by arranging the intaken pieces of digital literature on the user interface based on a determined rank. In conventional systems, a user typically has to parse each piece of digital literature file for potential adverse events or signals, determine the case information, and manually arrange the case information thereon. In comparison and as will be further described herein, the present systems and methods may arrange the digital literature based on a determined rank for each piece of digital literature. In one example, multiple pieces of digital literature may be arranged on the user interface based on the number and breadth of key terms that appear in the digital literature (e.g., in one or more linguistic sections of the digital literature) as well as based on user-defined preferences. Then, once arranged, the present systems and methods may highlight or emphasize the key terms such that the pertinent, key terms are displayed with extra emphasis placed on the user interface. By doing so, the systems and methods described herein arrange the digital literature based on the pertinence and importance of the digital literature and provide an improved user interface for displaying case information. This arrangement provides the user with the important digital literature proximate the top or center of the user interface (i.e., where the user typically first looks), providing for a quick assessment of each piece of digital literature.

Additionally, by utilizing a ranking algorithm to determine if a piece of digital literature is a priority to the customer or user, the present systems and methods provide for additional fine-tuning and user-customization that allow the present methods to be applied to each individual situation. For instance, a generic drug marketer/manufacturer and a novel cancer drug marketer/manufacturer are going to encounter entirely different problems when attempting to scan literature for adverse events or potential signals. The generic drug manufacturer may have to go to extra lengths to determine if the medication being identified in the digital literature is their own and not a competition. As a result, a generic drug manufacturer will want to rank a piece of digital literature and generate a case dataset, after matching multiple pieces of adverse event data and/or medical product data. In comparison, a novel cancer drug marketer may sell the only drug on the market that includes a specific active ingredient or specific substance and be relatively new (thereby wanting to be extra cautious with catching adverse events). As a result, the novel cancer drug marketer will want to rank a piece of digital literature and generate a case dataset after matching possibly two pieces of adverse event data. The present system and methods provide for the flexibility and fine-tuning to react automatically to both situations. For instance, because the present systems and methods receive one or more literature ranking preferences and then rank the literature based on the literature ranking preferences, the present systems and methods can be tuned to whatever situation a customer may encounter, thereby providing for more accurate and precise literature ranking. By doing so, the present systems and method require less processing power and memory, when compared to typical medical product coding systems, by generating less incorrectly ranked literature and reported case datasets that require detection and correction (thereby requiring the same process to be repeated multiple times).

As used herein, the term "event," "medical event," or "adverse event" can include any untoward medical occurrence which happens to either a patient or a subject in a clinical investigation or during regular use of a medical product that has been given to that person. For example, the "event," "medical event," or "adverse event" may encompass any signs which are unfavorable and unexpected for the patient or subject, including any abnormal laboratory findings such as a high blood pressure, a rapid heart rate, etc. The "event," "medical event," or "adverse event" could be symptoms, or a disease temporally associated with the use of a medical product and does not have to have been previously associated with that product. The term "event," "medical event," or "adverse event" can further encompass adverse reactions and serious adverse events such as death, life-threatening adverse experiences, inpatient hospitalization, congenital birth defects, disabilities, etc. Further, each "event," "medical event," or "adverse event" may be defined by the Medical Dictionary for Regulatory Activities (MedDRA) (or other medical code dictionaries) and associated with a specific MedDRA code. Moreover, "event information" "medical event information" "adverse event information" "event data" "medical event data" or "adverse event data" can include information associated with the event such as the date of onset of the event, the date of cessation of the event, the type of event, the dictionary (i.e., digital dictionary, medical dictionary, digital medical dictionary, etc.) or medical term (e.g., MedDRA term), the dictionary or medical code (e.g., MedDRA code), event comments, the outcome of the event, the location of the event (e.g., country where the event occurred), the event duration, patient data for a patient who endured or to which the event occurred, medical products that the patient consumed and/or dosages for the consumed medical products, the event rank, event contacts, the event type, and any associated event documents.

As used herein, the term "case" or "case dataset" can include an Individual Case Safety Report (ICSR) as defined by the standard ISO/HL7 27953 of the International Standards Organization (ISO) as well as any past or future standards governing ICSRs of the ISO, the World Health Organization (WHO), the Food and Drug Administration (FDA), the European Medicines Agency (EMA), or other national health agencies governing ICSRs. Moreover, "case information" "case data" or "case dataset" can include information associated with or included in the case such as adverse event data, case contact data, case identifier (e.g., case worldwide ID (WWID), case number, etc.), case priority data, case seriousness data, case documents, medical product data, medical product registrations, patient data, and other data associated with a case as defined by the standard ISO/HL7 27953 as well as any past or future standards governing ICSRs of the ISO, the WHO, the FDA, the EMA, or other national health agencies governing ICSRs.

As used herein, the term "signal" can include a signal as defined by the WHO, the FDA, the EMA, or other health agencies. Further, the term "signal" can include information on a new or known adverse event that is likely caused by a medical product and may be generated from more than a single case associated with the adverse event.

As used herein, the term "medical literature" "literature", or "a piece of literature" can include literature, published documents, or websites such as articles published in Peer-reviewed Journals (e.g., The Journal of Pharmacovigilance, the Drug Safety journal, The Annals of Pharmacotherapy, etc.), conference abstracts, social media posts (e.g., a post on Facebook® identifying an adverse reaction that occurred to somebody, a video on YouTube®, a tweet on Twitter® or X®, etc.), Industry publications (e.g., the Pharmaceutical Journal, etc.), or patient-oriented publications (e.g., an article on ConsumerMedSafety.org, etc.).

Referring now to FIG. 1, a system 100 for intaking and managing digital literature is shown, according to an example embodiment. The system 100 includes a provider computing system 104, multiple partner computing systems 108, multiple user computing devices 112, and a digital literature file repository 114 connected by a secure network (e.g., a network 118).

The network 118 communicably and operably couples the provider computing system 104, the partner computing devices 108, the user computing devices 112, and the digital literature file repository 114 such that communicable and operable computing may be provided between the provider computing system 104, the partner computing devices 108, the user computing devices 112, and the digital literature file repository 114 over the network 118. In various embodiments, the network 118 includes any combination of a local area network (LAN), an intranet, the Internet, or any other suitable communications network, directly or through another interface.

The provider computing system 104 may be operated and managed by a provider (e.g., a software as a service (SaaS) provider, a cloud services provider, a software provider, a service provider, etc.) and may include a computer system (e.g., one or more servers (e.g., a cloud computing server) each with one or more processing circuits). In some embodiments, the provider computing system 104 may act as a host and provide an application (e.g., a web-based application, a mobile application, etc.) to one of the user computing devices 112 over the network 118 in response to authenticating the respective computing device. For example, the provider computing system 104 may receive authentication data (e.g., a username and corresponding password, a limited-use key, a two-factor authentication code or key, etc.) from one of the user computing devices 112. The provider computing system 104 may then authenticate the user computing device 112 based on the authentication data and provide an application to the user computing device 112 over the network 118. In some examples, the provider computing system 104 may be a multi-tenant system where various elements of hardware and software may be shared by one or more customers. In a multi-tenant system, a user is typically associated with a particular customer. In one example, a user (e.g., of the user computing device 112) could be an employee of one of a number of (pharmaceutical) companies which are tenants, or customers, of the provider computing system 104.

In some embodiments, the provider computing system 104 may run on a cloud computing platform. Users can access content on the cloud independently by using a virtual machine image or purchasing access to a service maintained by a cloud repository provider.

In some embodiments, the provider computing system 104 may be provided as Software as a Service ("SaaS") to allow users to access the provider computing system 104 with a thin client.

As shown, the provider computing system 104 may include a network interface 126, a processing circuit 128, a digital literature repository 132, a case repository 134, and a signal repository 135. In some embodiments, the provider computing system 104 may include an input/output circuit (e.g., similar to (e.g., the same as) an input/output circuit 162 as will described further herein).

The network interface 126 is structured to establish connections with the partner computing devices 108, the user computing devices 112, and the digital literature file repository 114 by way of the network 118. The network interface 126 includes program logic (such as AS2 Gateway logic) and/or hardware-based components that connect the provider computing system 104 to the network 118. For example, the network interface 126 may include any combination of a wireless network transceiver (e.g., a cellular modem, a broadband modem, a Bluetooth transceiver, a Wi-Fi transceiver, a Li-Fi transceiver, etc.) and/or a wired network transceiver (e.g., an Ethernet transceiver). In some embodiments, the network interface 126 includes the hardware and machine-readable media structured to support communication over multiple channels of data communication (e.g., wireless, Bluetooth, near-field communication (NFC). In some embodiments, the network interface 126 includes cryptography logic and capabilities to establish a secure communications session.

In some embodiments, the network interface 126 includes Applicability Statement 2 (AS2) gateway logic (not shown). The AS2 Gateway logic may include programmable instructions that facilitate communication (transmission and receipt) using the Applicability Statement 2 (AS2) communication protocol (as specified in Request for Comment (RFC) 4130) over the network 118 via the network interface circuit 126. For example, using the AS2 gateway logic, the network interface 126 may transmit or receive files (e.g., the source file, a case, etc.) or other data to the partner computing systems 108 or user computing devices 112 using the AS2 Gateway protocol. In other embodiments, the AS2 gateway logic may transmit or receive files using the most up to date Applicability Statement communication protocol (e.g., AS3, etc.).

The processing circuit 128, as shown, comprises a memory 136, a processor 138, a case intake and management circuit 140, a digital literature intake and management circuit 144, a translation and linguistic management circuit 146, and a signal management circuit 148. The memory 136 includes one or more memory devices (e.g., RAM, NVRAM, ROM, flash memory, hard disk storage, etc.) that store data and/or computer code for facilitating the various processes described herein. That is, in operation and use, the memory 136 stores at least portions of instructions and data for execution by the processor 138 to control the processing circuit 128. The memory 136 may be or include tangible, non-transient volatile memory and/or non-volatile memory. The processor 138 may be implemented as a general-purpose processor, an application specific integrated circuit (ASIC), one or more field programmable gate array (FPGAs), a digital signal processor (DSP), a group of processing components or other suitable electronic processing components.

As described herein, the case intake and management circuit 140 is structured or configured to receive, generate, store, and manage case datasets. For instance, the case intake and management circuit 140 may be configured or structured to (periodically) receive or retrieve adverse event data associated with an adverse event from a trusted source (e.g., one of the partner repositories 162, the digital literature intake and management circuit 144, etc.). The case intake and management circuit 140 may then match the adverse event data with medical product data of a medical product repository (not shown), generate a case dataset including case data, and store the case dataset within the case repository 134. In one example, the case intake and management circuit 140 may be an instance of Vault Safety®. In some embodiments, the provider computing system 104 may include multiple case intake and management circuits 140 (e.g., one for each customer, one for each user, etc.). In some embodiments, when generating the case dataset, the case intake and management circuit 140 may further search the case repository 134 for case datasets which may be a duplicate of the newly generated case. In other embodiments, the case intake and management circuit 140 may output (via the network interface circuit 126) one or more of the case datasets as a specific file type (e.g., E2B (R3) XML file, as a Council for International Organizations of Medical Sciences (CIOMS) II PDF file, etc.) to one or more of the partner computing systems 108 or the user computing devices 112. In other embodiments, a submission management circuit (not shown) outputs the case datasets and/or the digital documents described herein.

Additionally, the case intake and management circuit 140 may be configured or structured to retrieve cases from the case repository, in response to receiving a request including case criteria (e.g., a medical product of the case, a date of the case, a state of the case (e.g., open, closed, submitted, pending review), a country in which the case took place, etc.) from one of the user computing devices 112.

As described herein, the digital literature intake and management circuit 144 may be structured or configured to receive digital literature files (e.g., Research Information Systems (RIS) files, text files, Word files, HTML files, XML files, etc.) including one or more linguistic sections including words and terms that define the literature file and intake the digital literature file by translating, ranking, and/or interpreting the file to select key terms of the literature file. For example, the digital literature intake and management circuit 144 may receive a digital literature file including a linguistic section in a first language (e.g., Chinese). The digital literature intake and management circuit 144 may provide the digital literature file (or the linguistic section(s) thereof) to the translation and linguistic management circuit 146 for translation to a second language (e.g., English). In response, the digital literature intake and management circuit 144 may receive the linguistic section in the second language from the translation and linguistic management circuit 146. In another example, the digital literature intake and management circuit 144 may provide the digital literature file (or the linguistic section(s) thereof) to one of the partner computing systems 108 (e.g., one which is operated by a translation service) for translation to the second language (e.g., English). In response, the digital literature intake and management circuit 144 may receive the linguistic section in the second language from the partner computing system 108. In some embodiments, the digital literature intake and management circuit 144 may generate a data object or structure that represents the piece of literature of the digital literature file and store the generated data object (e.g., in the digital literature repository 132).

Further, the digital literature intake and management circuit 144 may interpret the linguistic section to determine key terms or phrases of the linguistic section. For example, the digital literature intake and management circuit 144 may search the linguistic section of the digital literature file for terms or phrases that are associated with or match medical product data or terms (e.g., medical product names or aliases or identifiers (e.g., drug x, drug x—10 mg, Ibuprofen, generic Ibuprofen, company 123 Ibuprofen, national drug code (NDC) 123, etc.), seriousness terms (e.g., death, died, hospitalized, survived, fatal, defect, birth defect, etc.), study terms or identifiers (clinical study, clinical trial, phase III, phase 3, phase, study ID 123, etc.), demographic terms (e.g., age, gender, ethnicity, married, zip code, etc.), patient terms (name, date of birth, address, zip code, etc.), reporter terms (e.g., reported by, country of origin, country, etc.), adverse event terms (e.g., MedDRA codes, MedDRA terms, cancer, etc.), and/or date/time terms (e.g., occurred on, happened on, onset, Jul. 1, 2021, July, $19^{th}$ century, etc.). In some embodiments, the digital literature intake and management circuit 144 may retrieve medical product data (e.g., from a medical product repository (not shown)), study data (e.g., from a study repository (not shown)), seriousness data (e.g., from a seriousness repository (not shown)), and/or adverse event code or term data ((e.g., from a MedDRA repository (not shown)) and determine key terms or phrases of the linguistic section by matching the terms or phrases of the linguistic section with the same terms or phrases in the retrieved data.

In some embodiments, the digital literature intake and management circuit 144 may further distinguish between or classify the determined terms and/or phrases into one or more classifications (e.g., medical product terms and/or phrases, seriousness terms and/or phrases, study terms and/or phrases, demographic terms and/or phrases, etc.). For example, the digital literature intake and management circuit 144 may determine multiple key terms including "hospitalized", "survived", "drug x", "300 mg", "occurred on Jul. 1, 2021", and "male". Then, the digital literature intake and management circuit 144 may classify the terms "hospitalized" and "survived" as seriousness terms and/or phrases; the terms "drug x" and "300 mg" as medical product terms and/or phrases, the phrase "occurred on Jul. 1, 2021" as a date/time term and/or phrase; and the term "male" as a demographic term and/or phrase.

In some embodiments, the processing circuit 128 and and/or the digital literature intake and management circuit 144 may include an artificial intelligence (AI) circuit that may use an AI model (e.g., a natural language processing (NLP) model, a large language model (LLM), a semantic text model, etc.) to interpret the linguistic section(s) of the digital literature file and determine the key terms and/or phrases of the linguistic section. In one example, the AI circuit may utilize an NLP model to interpret the linguistic sections of the piece of literature and select the key terms and/or phrases. NLP AI models use algorithms and machine learning techniques to analyze and extract meaning from text or speech. They break down sentences into smaller components, such as words or phrases, and identify the relationships between them. This helps them understand the context, sentiment, and intent behind the input. These models can perform various tasks, including language translation, sentiment analysis, text summarization, question answering, and chatbot interactions. In this regard, the digital literature intake and management circuit 144 may use an NLP AI model to interpret the linguistic sections of the digital literature file and determine key terms and/or phrases based on the retrieved or received data (e.g., the medical product data, the study data, the seriousness data, the adverse event codes, etc.).

Figure 5A:
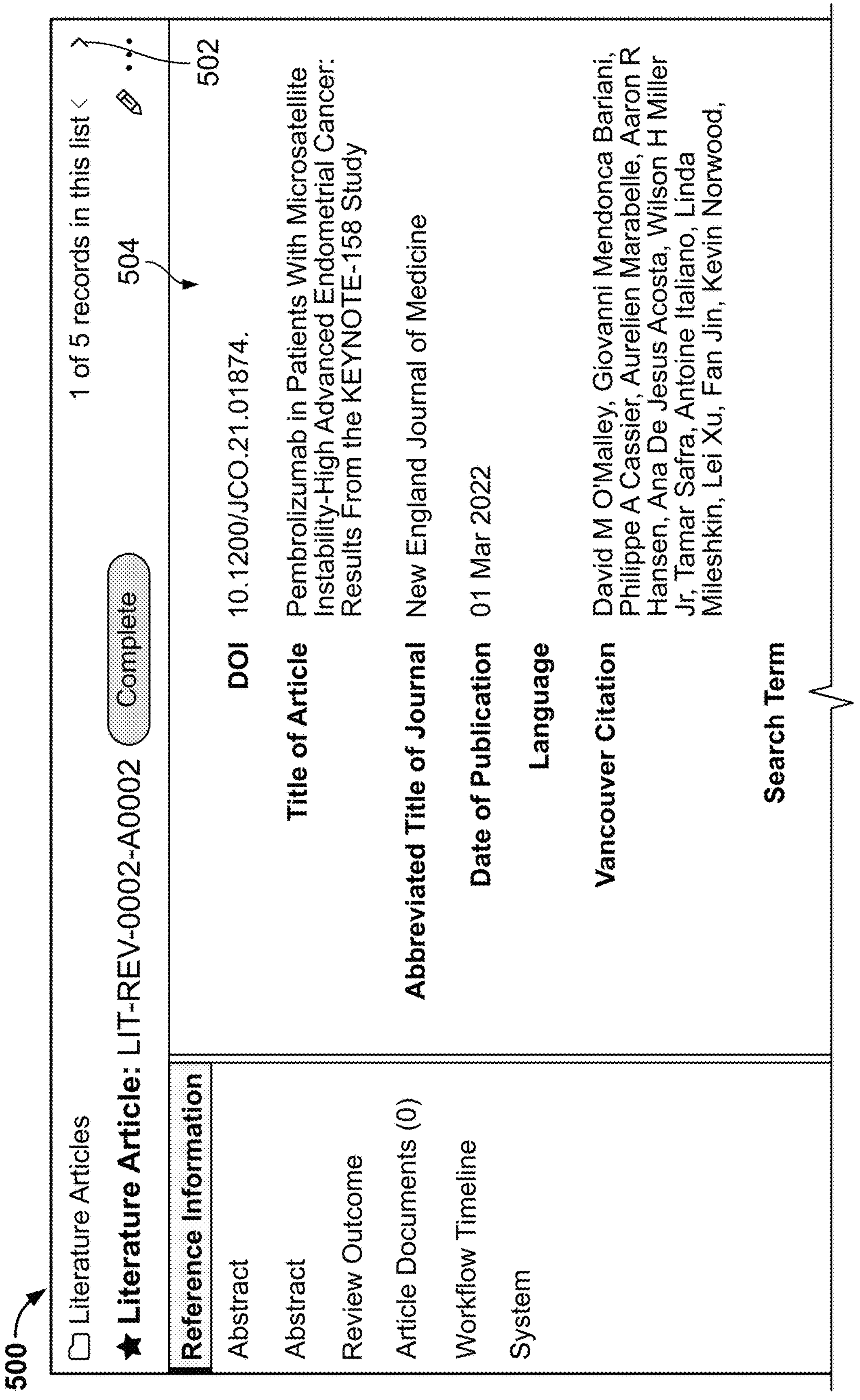
FIGS. 5A-5B may be illustrations of some aspects of a user interface generated by the digital literature management system of FIG. 1 to review a piece of digital literature, according to an example embodiment.
Figure 5B:
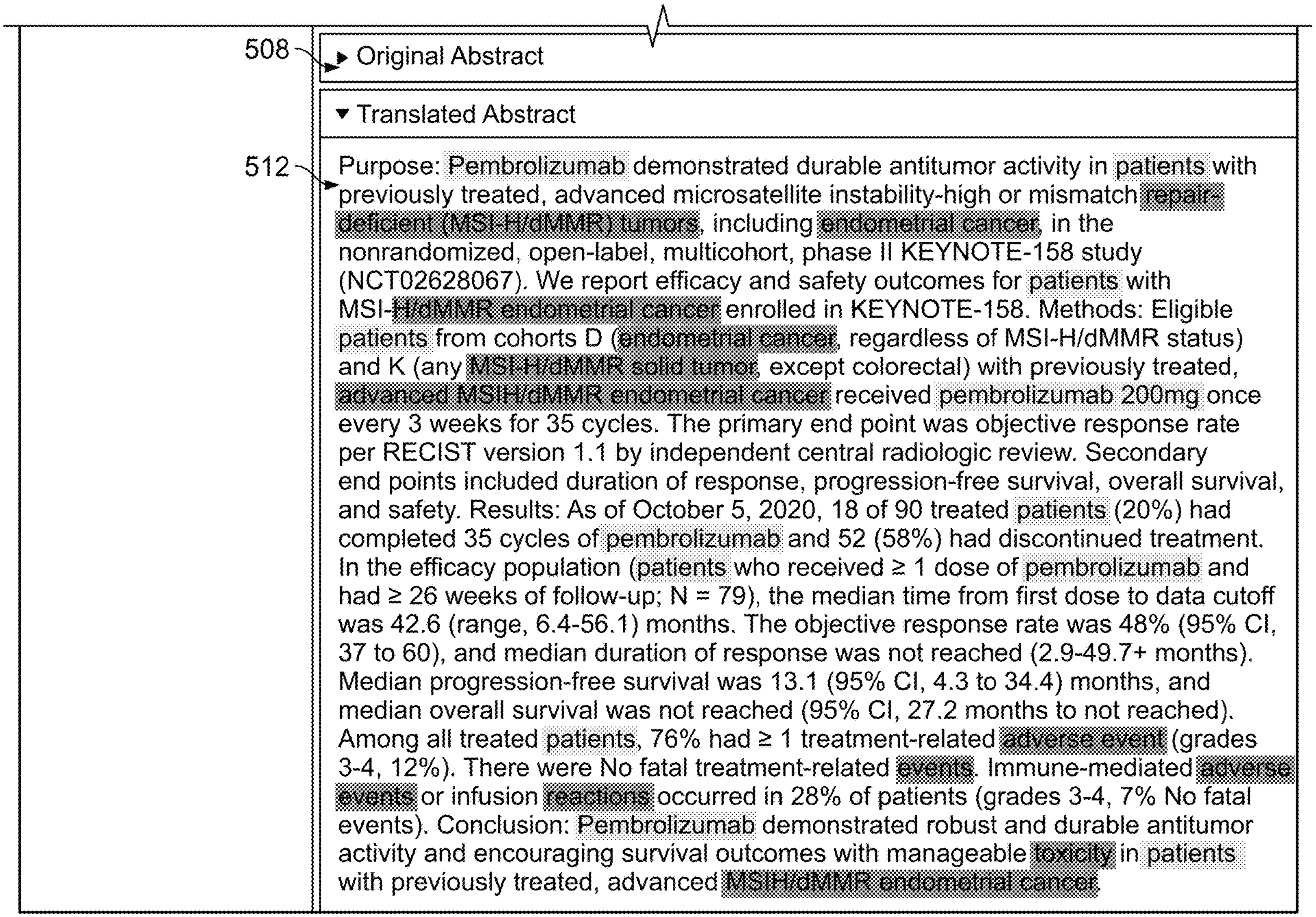

For instance, FIGS. 5A-5B shows a literature page 500 with a translated abstract having multiple highlighted terms and or phrases. In this regard, the provider computing system 104 (and the digital literature intake and management circuit 144) may receive the digital literature file associated with the piece of literature shown on the literature page 500. Then, the digital literature intake and management circuit 144 (or an AI circuit thereof) may retrieve or receive retrieve medical product data (e.g., from the medical product repository (not shown)), study data (e.g., from the study repository (not shown)), seriousness data (e.g., from the seriousness repository (not shown)), and/or adverse event code or term data ((e.g., from a MedDRA repository (not shown)). Next, the digital literature intake and management circuit 144 (or an AI circuit thereof) may use an AI model (e.g., an NLP model) to interpret the linguistic section of the digital literature file based on the received data (e.g., the medical product data, the study data, etc.) and select key terms or phrases. The digital literature intake and management circuit 144 (or an AI circuit thereof) may then classify or group each term and/or phrase and display the linguistic section on the literature page 500 with the key terms and/or phrases highlighted thereon (e.g., based on the classification or grouping).

In other embodiments, the digital literature intake and management circuit 144 may utilize a LLM to digitally interpret the linguistic sections of the digital PVA. LLMs, such as the GPT-3.5 architecture, are advanced AI systems and models that provide for understanding and generating of human language. They are designed to handle a wide range of natural language tasks with accuracy and fluency. These models are trained on vast amounts of text data, including books, articles, websites, and other sources of written information. By learning from this data, they develop an understanding of grammar, syntax, and the nuances of language usage. They can also grasp relationships between words, phrases, and concepts. LLMs work by processing text input and generating relevant and coherent responses. They break down the input into smaller units, such as words or sentences, and analyze the context and meaning behind them. This analysis helps them generate accurate and contextually appropriate output.

In other embodiments, the digital literature intake and management circuit 144 may utilize other AI models (e.g., semantic text models, recurrent neural networks (RNN), convolution neural networks, (CNN), Sequence-to-Sequence models, etc.) to digitally interpret the linguistic sections of the digital literature file and determine the key terms and/or phrases.

Once the digital literature intake and management circuit 144 has determined the key terms and/or phrases, the digital literature intake and management circuit 144 may further rank the piece of digital literature. For instance, the digital literature intake and management circuit 144 may rank or score the piece of digital literature based on the determined key terms and/or phrases. For example, a first piece of digital literature including a key term or phrase identifying a medical product (e.g., Drug x), a key term or phrase identifying a date/time (e.g., occurred on date 1), a key term or phrase identifying an adverse event (e.g., Heart attack), and a key term or phrase identifying a seriousness of resulted in death (e.g., the patient died) may be assigned the highest ranking (e.g., rank 1). In comparison, a second piece of digital literature including a key term or phrase identifying a medical product (e.g., Drug x), a key term or phrase identifying a date/time (e.g., occurred on date 1), a key term or phrase identifying an adverse event (e.g., Heart attack), and a key term or phrase identifying a seriousness of hospitalization (e.g., the patient was hospitalized but recovered) may be assigned the second highest ranking (e.g., rank 2). Moreover, a third piece of digital literature including a key term or phrase identifying a date/time (e.g., occurred on date 1), a key term or phrase identifying an adverse event (e.g., Heart attack), and a key term or phrase identifying a seriousness of non-serious (e.g., the patient was perfectly okay), but not having or including a key term or phrase identifying a medical product (e.g., Drug x), may be assigned the lowest ranking (e.g., rank 7).

In some embodiments, the digital literature intake and management circuit 144 may further analyze the received linguistic section and/or the key terms and/or phrases of the digital literature file to determine potential adverse event data. For instance, the digital literature intake and management circuit 144 may determine the key terms and/or phrases (e.g., "Drug x", "300 mg IV" "stomach cancer", "occurred on Jun. 1, 2021" and "clinical trial 123, phase III, "resulted in death") indicate or represent an adverse event that is to be reported. Accordingly, the digital literature intake and management circuit 144 may generate a potential case dataset (e.g., an inbox item data object) and provide the adverse event data to the case intake and management circuit 140 for generation of a case dataset. In other embodiments, the digital literature intake and management circuit 144 may provide the intaken digital literature file (or the digital literature data object) and the key terms and/or phrases to the case intake and management circuit 140 which may analyze the received linguistic section and/or the key terms and/or phrases of the digital literature file to determine potential adverse event data.

In some embodiments, the digital literature intake and management circuit 144 may further analyze the received linguistic section and/or the key terms and/or phrases of the digital literature file in combination with previously received digital literature files to determine potential signals. For instance, the digital literature intake and management circuit 144 may determine the key terms and/or phrases (e.g., "Drug x", "300 mg IV" "stomach cancer", "occurred on Jun. 1, 2021" and "clinical trial 123, phase III, "resulted in death") of the received digital literature file along with the previously received terms ("Drug x", "300 mg IV" "stomach cancer") of previously received digital literature files indicate or represent a potential signal that is to be monitored and/or reported. Accordingly, the digital literature intake and management circuit 144 may generate a potential signal (e.g., a signal data object) and provide the digital literature file to the signal management circuit 148 for generation of a case dataset. In other embodiments, the digital literature intake and management circuit 144 may provide the intaken digital literature file (or the digital literature data object) and the key terms and/or phrases to the signal management circuit 148 which may analyze the received linguistic section and/or the key terms and/or phrases of the digital literature file as well as previous digital literature files to determine potential signals and signal data.

The translation and linguistic management circuit 146 may be structured to manage the language of the received literature file by determining a specific language linguistic sections are be received in and/or translated to. For example, the translation and linguistic management circuit 146 may determine the linguistic section is to be translated to English due to the customer being based in the USA. Further, in response to receiving the linguistic section in a different language than the specific language (e.g., not English), the translation and linguistic management circuit 146 may automatically translate the linguistic section to the specific language, as will be described further herein. For example, the translation and linguistic management circuit 146 may use rule-based machine translation (e.g., dictionary-based machine translation using a translation repository (not shown)), transfer-based machine translation, interlingual machine translation, statistical machine translation, example-based machine translation, hybrid machine translation, and/or Neural machine translation using a neural network (not shown).

The signal management circuit 148 is structured or configured to retrieve a specified set of case data or adverse event data and analyze the specified set of case data for potential signals and statistical values. For example, the signal management circuit 148 may determine one or more statistical values based on the case data. For instance, the signal management circuit 148 may determine a first potential signal associated with the adverse event "Headache" and the medical product "Drug X" based on case data and then determine one or more statistical values (e.g., case count, disproportionality analysis values, etc.) such as a Proportional Reporting Ratio (PRR) statistical value, a chi-squared ($x^2$) test statistical value, and/or multiple Empirical Bayes (EB) statistical values. The signal management circuit 148 may then provide the potential signal and/or the statistical values to one of the user computing devices 108 for verification. In some embodiments, the signal analyzation circuit 142 may monitor new case data for a change to a signal (e.g., new cases associated with the medical product and the adverse event, changes to the one or more statistical values, and the like). In some embodiments, the signal management circuit 148 may store the signal and the one or more statistical values within the signal repository 135 of the provider computing system 104. In some embodiments, the signal management circuit 148 may generate a signal data object associated with a medical product and an adverse event, in response to receiving a request to do so.

Still referring to FIG. 1, the digital literature repository 132 may be repository (e.g., a database) that is structured or configured to receive, store, and manage digital literature files and/or literature data objects. In this regard, the digital literature repository 132 may receive, store, and manage digital literature files including multiple linguistic sections and multiple key terms and/or phrases. In some embodiments, the digital literature repository 132 may further receive and manage a literature data object/structure or digital document file wrapper that includes the linguistic section of the literature file and the associated key terms and/or phrases. For instance, the digital literature repository 132 may receive a literature data object that includes the linguistic section of the digital literature file and/or the determined key terms and/or phrases and store the literature data object therein. Accordingly, the digital literature repository 132 can be structured according to various database types, such as, relational, hierarchical, network, flat, point-in time, and/or object relational. Further, the digital literature repository 132 may include a plurality of nonvolatile/non-transitory storage media such as solid-state storage media, hard disk storage media, virtual storage media, cloud-based storage drives, storage servers, and/or the like.

Likewise, the case repository 134 may be repository (e.g., a database) that is structured or configured to receive, store, and manage case datasets and their respective data (e.g., case data, adverse event data, etc.). For example, the case repository 134 may receive case datasets and related case objects and store the case datasets therein. Then, in response to receiving a query or a request for one or more case datasets (e.g., a query for all cases that include a specific medical term and/or code) the case repository 134 may provide and/or return the case datasets stored therein that match the query or request. For example, the case repository 134 may receive a query from the signal management circuit 148 for all cases that include a specific criteria (e.g., a specific medical product, a specific country of origin, a specific date range). In response, the case repository 134 may determine each case dataset that includes the specific criteria stored therein and return each case dataset. Further, the case repository 134 can be structured according to various database types, such as, relational, hierarchical, network, flat, point-in time, and/or object relational. In some embodiments, the case repository 134 includes a plurality of non-volatile/non-transitory storage media such as solid-state storage media, hard disk storage media, virtual storage media, cloud-based storage drives, storage servers, and/or the like.

Similarly, the signal repository 135 may be repository (e.g., a database) that is structured or configured to receive, store, and manage signals or potential signals of users or customers. In this regard, the signal repository 135 may receive, store, and manage signal data objects or structures including multiple case datasets therein. For instance, the signal repository 135 may receive a signal data object for a specific adverse event (e.g., heart attack) and medical product (e.g., Drug X) and store the data object therein. The signal data object may include seven separate case datasets that are each associated with the specific adverse event and the specific medical product. Accordingly, the signal repository 135 can be structured according to various database types, such as, relational, hierarchical, network, flat, point-in time, and/or object relational. Further, the signal repository 135 may include a plurality of nonvolatile/non-transitory storage media such as solid-state storage media, hard disk storage media, virtual storage media, cloud-based storage drives, storage servers, and/or the like.

While not shown, in some embodiments, the provider computing system 104 may include a separate repository for each data or document type described herein. For instance, the provider computing system 104 may include the case repository 134, the digital literature repository 132, the signal repository 135, a partner repository (for storing electronic addresses, user communication protocols, and the like associated with partner computing systems 108) (not shown), a study repository (not shown), a medical product repository (not shown), an account repository (not shown) (for storing customer account data including usernames or account associated with the customer), and the like.

Still referring to FIG. 1, the partner computing systems 108 may be managed by third-party partners (e.g., the FDA, the EHA, Health Canada, partner company 1, partner company 2, partner computing system xyz, translation partner 1, translation partner 2, a regulatory submission publisher or company (e.g., Vault RIM®), etc.) and can be or include a computing device or system configured to communicate with the provider computing system 104 over the network 118. For instance, the partner computing systems 108 can be a server computer system, a gateway computing system, a laptop computer a desktop computer, and any other network-connected device that can communicate over the network 118. For example, one of the partner computing systems 108 may be the Electronics Submission Gateway (ESG) of the FDA through which one or more E2B XML files may be received from and/or provided to. In another example, one of the partner computing systems 108 may be a laptop computer operated by an employee of a partner translation company.

In operation, the partner computing systems 108 may communicate with the provider computing system 104 or the user computing device 112 to send and/or receive one or more electronic communications. For instance, a customer (e.g., pharma company 123) may have a translation services agreement with a translation services company. Accordingly, the provider computing system 104 may provide linguistic section(s) to the partner computing system 108 in a first language for translation to a second language. In response, the provider computing system 104 may receive the linguistic section in the second language from the partner computing system 108. As shown, each partner computing system 108 includes a network interface 156, a processing circuit 160, and a partner repository 162.

The network interface 156 is structured to establish connections with the provider computing system 104 and/or the digital literature file repository 114 by way of the network 118. The network interface 156 includes program logic and/or hardware-based components that connect each partner computing system 108 to the network 118. For example, the network interface 156 may include any combination of a wireless network transceiver (e.g., a cellular modem, a broadband modem, a Bluetooth transceiver, a Wi-Fi transceiver, a Li-Fi transceiver, etc.) and/or a wired network transceiver (e.g., an Ethernet transceiver). In some embodiments, the network interface 156 includes the hardware and machine-readable media structured to support communication over multiple channels of data communication (e.g., wireless, Bluetooth, near-field communication (NFC). In some embodiments, the network interface 156 includes cryptography logic and capabilities to establish a secure communications session.

In some embodiments, the network interface 156 includes AS2 gateway logic (not shown). The AS2 Gateway logic may include programmable instructions that facilitate communication (transmission and receipt) using the Applicability Statement 2 (AS2) communication protocol (as specified in Request for Comment (RFC) 4130) over the network 118 via the network interface circuit 156. For example, using the AS2 gateway logic, the network interface 156 may transmit or receive files (e.g., the source file, a case, etc.) or other data to the provider computing system 104 using the AS2 Gateway protocol. In other embodiments, the AS2 gateway logic may transmit or receive files using the most up to date Applicability Statement communication protocol (e.g., AS3, etc.).

The processing circuit 160, as shown, comprises a memory 168 and processor 170. The memory 168 includes one or more memory devices (e.g., RAM, NVRAM, ROM, flash memory, hard disk storage, etc.) that store data and/or computer code for facilitating the various processes described herein. That is, in operation and use, the memory 168 stores at least portions of instructions and data for execution by the processor 170 to control the processing circuit 160. The memory 168 may be or include tangible, non-transient volatile memory and/or non-volatile memory. The processor 170 may be implemented as a general-purpose processor, an application specific integrated circuit (ASIC), one or more field programmable gate array (FPGAs), a digital signal processor (DSP), a group of processing components or other suitable electronic processing components.

The partner repository 162 may be similar or the same as the case repository 134 and/or the digital literature repository 132 and is a repository (e.g., a database, cloud storage, etc.) that is structured or configured to receive, store, and manage digital documents or case datasets. For example, one of the partner computing systems 108 may receive a case dataset from the provider computing system 104 and store the case dataset in the partner repository 162. In another example, one of the partner computing systems 108 may receive a linguistic section of the digital literature from the provider computing system 104 and store the linguistic section in the partner repository 162. Further, the partner repository 162 can be structured according to various database types, such as relational, hierarchical, network, flat, point-in time, and/or object relational. In some embodiments, the partner repository 162 includes a plurality of nonvolatile/non-transitory storage media such as solid-state storage media, hard disk storage media, virtual storage media, cloud-based storage drives, storage servers, and/or the like. In some embodiments, the partner computing system 108 includes a partner case repository (not shown) which is separate from a partner digital literature repository (not shown), in place of the partner repository 162.

Still referring to FIG. 1, the user computing devices 112 can each be any type of computing device or computing system. For instance, each user computing device 112 can be one or more of a mobile phone, a tablet computer, a laptop computer, a smart watch, a server computer system, or any other internet-connected device. In operation, the user computing devices 112 may communicate and interface with the provider computing system 104 via the network 118 to provide an electronic request to intake the digital literature file and/or to confirm key terms and/or phrases of the digital literature file. As shown, each user computing device 112 may include a network interface 176, a processing circuit 178, and the input/output (I/O) circuit 180.

The network interface 176 is structured to establish connections with the provider computing system 104 by way of the network 118. The network interface 176 includes program logic and/or hardware-based components that connect the user computing device 112 to the network 118. For example, the network interface 176 may include any combination of a wireless network transceiver (e.g., a cellular modem, a broadband modem, a Bluetooth transceiver, a Wi-Fi transceiver, a Li-Fi transceiver, etc.) and/or a wired network transceiver (e.g., an Ethernet transceiver). In some embodiments, the network interface 176 includes the hardware and machine-readable media structured to support communication over multiple channels of data communication (e.g., wireless, Bluetooth, near-field communication (NFC). In some embodiments, the network interface 176 includes cryptography logic and capabilities to establish a secure communications session.

The processing circuit 176, as shown, comprises a memory 182, a processor 184, and a user interface generation or rendering circuit 186. The memory 182 includes one or more memory devices (e.g., RAM, NVRAM, ROM, flash memory, hard disk storage, etc.) that store data and/or computer code for facilitating the various processes described herein. That is, in operation and use, the memory 182 stores at least portions of instructions and data for execution by the processor 184 to control the processing circuit 176. The memory 182 may be or include tangible, non-transient volatile memory and/or non-volatile memory. The processor 184 may be implemented as a general-purpose processor, an application specific integrated circuit (ASIC), one or more field programmable gate array (FPGAs), a digital signal processor (DSP), a group of processing components or other suitable electronic processing components.

The user interface rendering circuit 186 may be configured to receive a user interface (e.g., a web interface in an HTML file and related files, a downloaded graphical user interface, etc.) from the provider computing system 104 and render the user interface on the user computing device 112 via the I/O circuit 180. In this way, the provider computing system 104 may generate one or more user interfaces and provide the one or more user interfaces to the user interface generation circuit 186 to be rendered on the user computing device 112 (e.g., on a display of the I/O circuit 180 of the user computing device 186).

The I/O circuit 180 is structured to receive communications from and provide communications to the user of the user computing device 112 (e.g., the user). In this regard, the I/O circuit 180 is structured to exchange data with the processing circuit 178 to provide output to the user and to receive input from the user. As a result, the I/O circuit 180 may include a display that may be manipulated by the application. In some embodiments, the I/O circuit 180 may also include a keyboard, a mouse, a joystick, a touch screen, touch areas, soft keys, a microphone, a speaker, a vibration mechanism, a sensor, a RFID scanner, or other input/output devices described herein.

The digital literature file repository 114 may be a repository (e.g., a database) that is structured or configured to receive, store, and manage digital literature files and provide the digital literature files to the provider computing system 104. Further, the digital literature file repository 114 may be operated by a medical literature provider or research provider (e.g., PubMed®, ScienceDirect®, Scopus®, JSTOR®, etc.). In this regard, the digital literature file repository 114 may be apart of a digital literature computing system (not shown) such as one or more server systems associated with the medical literature provider and including the digital literature file repository 114. In other embodiments, the digital literature file repository 114 may be included in the provider computing system 104 (not shown). In some embodiments, the provider computing system 104 or one of the user computing devices 112 may generate a request for digital literature file(s) including or identifying a medical product and/or a date range (e.g., published between date 1 and date 2). For instance, the provider computing system 104 may generate a request for digital literature with the request identifying a specific medical product (e.g., Drug x) and a specific date range (e.g., Jan. 1, 2021-Jan. 1, 2022). The digital literature file repository 114 may receive the request and search or return each piece of digital literature that matches or meets the specific medical product and the specific date range. Then, the digital literature file repository 114 may generate a digital literature file representing each piece of digital literature. For instance, the digital literature file repository 114 may determine 17 matching pieces of literature and generate an RIS file associated with each of the 17 matching pieces of digital literature (and including one or more linguistic sections for each of the 17). In this regard, the RIS file may not include each entire piece of digital literature (due to file size and copyright issues), but may include one or more linguistic sections for each that represent the piece of digital literature (e.g., title, authors, abstract, publishing academic department, etc.). Then, the digital literature file repository 114 may output the generated digital literature file to the provider computing system 104 or the user computing device 112 for ingestion and processing. FIGS. 4A-4B shows one example digital literature file 400.

Figure 2:
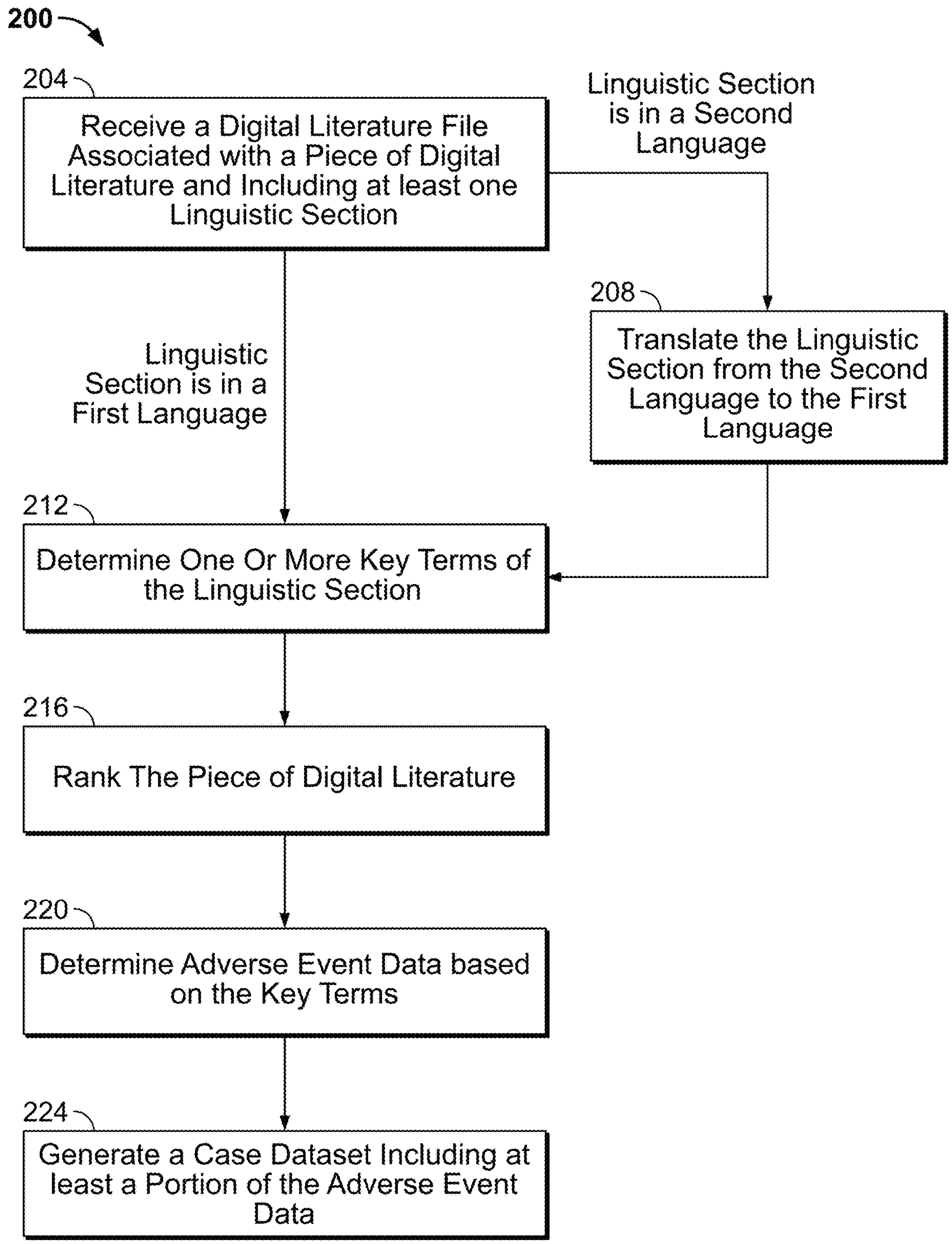
FIG. 2 may be a flow diagram of a method for generating a case dataset based on digital literature, according to an example embodiment.

Referring now to FIG. 2, a method 200 of generating a case dataset based on digital medical literature is shown, according to an example embodiment. Method 200 can be carried out by the system of FIG. 1. More particularly, the method 200 can be carried out by the processing circuit 128 of the provider computing system 104 and through communication with the partner computing systems 108 and the user computing devices 112.

Method 200 commences at step 204 at which the provider computing system 104 receives a digital literature file associated with a piece of digital literature and including at least one linguistic section. In some embodiments, the digital literature file is received from the digital literature file repository 114, in response to generating and providing a request for one or more pieces of digital literature. In other embodiment, the digital literature file is received from one of the user computing devices 112. As described herein, the digital literature file may be a text file (e.g., an RIS file, a DocX/Doc file, a txt file, an HTML file, an XML file, etc.) identifying one or more pieces of digital literature and having a linguistic section for each. For example, the received digital literature file may be an RIS file including one or more linguistic sections for 15 separate pieces of digital literature (e.g., a title, authors, and abstract for each of the 15 pieces of digital literature, etc.).

Additionally, each linguistic section for each piece of digital literature may be in a multitude of languages. In on example, a digital literature file may include a linguistic section for 15 separate pieces of digital literature. Further, each linguistic section may be in a different language (e.g., the first linguistic section of the first piece of digital literature is in a first language, the second linguistic section of the second piece of digital literature is in a second language, and so on). Further, before or at step 204, the provider computing system 104 may receive a system or language of preference (e.g., English) which each linguistic section is to be in. For example, the provider computing system 104 may receive a language of preference from one of the user computing devices 112. In other embodiments, the language of preference may be set, by the provider computing system 104, based on a medical product associated with the customer and/or the digital literature file (e.g., based on the country within which the medical product is registered, etc.).

In some embodiments, before or at step 204, the provider computing system 104 may receive literature ranking preferences and/or case intake preferences from one of the user computing devices 112. As described herein, the literature ranking preferences may include one or more requisite preferences and one or more optional preferences which are selected or set by the user computing device 112 and provide for the ranking of the piece of digital literature of the digital literature file. In this regard, the ranking preferences may each be or identify one or more classifications or groupings of the digital literature that either must be matched or should be matched to indicate the piece of digital literature is a priority to be reviewed and checked for adverse event data or signal data. For instance, at or before step 204, the provider computing system 104 may receive requisite preferences of seriousness and medical product, and an optional preference of date/time. Accordingly, when ranking or comparing each piece of digital literature of the digital literature file, the provider computing system 104 may rank each piece of digital literature based on the linguistic section for the piece of digital literature having a seriousness and a medical product as well as having a date/time (as identified in the key terms and/or phrases).

Likewise, the case intake preferences may include one or more requisite preferences and one or more optional preferences which are selected or set by the user computing device 112 and provide for the situation at which the piece of literature is automatically intaken as adverse event data and used for generation of a case dataset. In this regard, the case intake preferences may each be or identify one or more pieces of case data or adverse event data either must be matched or should be matched to indicate the piece of digital literature more likely than not identifies an adverse event that should be reported. For instance, at or before step 204, the provider computing system 104 may receive requisite preferences of date/time and medical product. Accordingly, when determining if the linguistic section includes adverse event data and should be intaken (e.g., an inbox item data object should be generated), the provider computing system 104 may rank each piece of digital literature based on the key terms and/or the linguistic section for the piece of digital literature having a medical product as well as having a date/time (as identified by key terms being grouped into the medical product grouping and the date/time grouping).

In some embodiments, the case intake preferences further include an intake threshold value. The threshold value may identify the confidence or ranking at which the provider computing system 104 can automatically proceed with determining adverse event data based on the piece of digital literature (and generating an inbox item data object) (vs. providing the piece of digital literature to the user computing device 112 for manual review). For instance, the user computing device 112 may provide case intake preferences, to the provider computing system 104, that include a threshold value of 1 or "entire match". Accordingly, the provider computing system 104 may not automatically determine adverse event data based on the linguistic section associated with the piece of digital literature unless the provider computing system 104 determines or finds a key term or phrase matching the requisite preferences and the optional preferences.

In some embodiments, at or after step 204, the provider computing system 104 may further generate a digital literature data object for each piece of digital literature associated with the digital literature file and assign or add each linguistic section to the respective digital literature data object. For instance, the digital literature file may be associated with (and include linguistic section(s)) with 15 pieces of digital literature. Then, at or after step 204, the provider computing system 104 may generate 15 separate digital literature data objects for each piece of digital literature and add the linguistic section(s) of each to the digital literature data object. Further, based on the digital literature file and the linguistic sections therein, the provider computing system 104 may determine or create one or more fields for each digital literature data object. For example, the provider computing system 104 may generate a digital literature data object and create a digital object identifier (DOI) field, a title field, a journal or publication title field, a date of publication field, a language field, a citation field, and/or an original abstract field based on the linguistic sections for the piece of the digital literature.

If, at step 204, the linguistic section is not in the language of preference (or a first language, the method 204 may proceed to step 208, at which the provider computing system 104 translates the linguistic section from the first language to the second language. For example, the provider computing system 104 may determine the linguistic section is to be translated to English due to the customer being based in the USA and may automatically translate the linguistic section to English, as will be described further herein. For example, the provider computing system 104 may use rule-based machine translation (e.g., dictionary-based machine translation using a translation repository (not shown)), transfer-based machine translation, interlingual machine translation, statistical machine translation, example-based machine translation, hybrid machine translation, and/or Neural machine translation using a neural network to translate the linguistic section from the current language to the specified language.

In other embodiments, at step 208, the provider computing system 104 may output or provide the linguistic section to one of the partner computing systems 108 associated with a translation service. Then, in response, the provider computing system 104 may receive the linguistic section in the specified language (e.g., English). In some embodiments, the linguistic section may be provided to a different partner computing system 108, dependent on the language of the linguistic section. For example, a linguistic section in Chinese may be provided to a Chinese translation service associated with a first partner computing system 108. In comparison, a linguistic section in French may be provided to a French translation service associated with a second partner computing system 108. Likewise, in some embodiments, the provider computing system 104 may translate linguistic sections in specific languages (e.g., French, Greek, Spanish, etc.) and may output linguistic sections in other specific languages to the partner computing system(s) 108 for translation (e.g., Chinese, Japanese, Arabic, Russian, etc.).

If, at step 204, the linguistic section is in the specified language or after step 208, the provider computing system 104 may proceed to step 212 at which the provider computing system 104 determines one or more key terms of the linguistic section(s). As described herein, the key terms may be terms or phrases associated with adverse events or potential signals such as medical product terms or phrases (e.g., medical product names or aliases or identifiers (e.g., drug x, drug x—10 mg, Ibuprofen, generic Ibuprofen, company 123 Ibuprofen, national drug code (NDC) 123, etc.), seriousness terms or phrases (e.g., death, died, hospitalized, survived, fatal, defect, birth defect, etc.), study terms or phrases or identifiers (clinical study, clinical trial, phase III, phase 3, phase, study ID 123, etc.), demographic terms (e.g., age, gender, ethnicity, married, zip code, etc.), patient terms (name, date of birth, address, zip code, etc.), reporter terms (e.g., reported by, country of origin, country, etc.), adverse event terms (e.g., MedDRA codes, MedDRA terms, cancer, etc.), and/or date/time terms (e.g., occurred on, happened on, onset, Jul. 1, 2021, July, $19^{th}$ century, etc.). In other embodiments, other key terms and/or phrases are possible such as medical device terms and/or phrases, vaccine terms and/or phrases, cosmetic terms and/or phrases, and the like.

In some embodiments, the provider computing system 104 may retrieve data for each grouping or classification of key terms such as medical product data (e.g., from a medical product repository (not shown)), study data (e.g., from a study repository (not shown)), seriousness data (e.g., from a seriousness repository (not shown)), and/or adverse event code or term data ((e.g., from a MedDRA repository (not shown)). Then, the provider computing system 104 may determine key terms or phrases of the linguistic section by matching the terms or phrases of the linguistic section with the same terms or phrases in the retrieved data.

In some embodiments, the provider computing system 104 may further distinguish between or classify the determined terms and/or phrases into one or more classifications (e.g., medical product terms and/or phrases, seriousness terms and/or phrases, study terms and/or phrases, demographic terms and/or phrases, etc.). For example, the provider computing system 104 may determine multiple key terms including "hospitalized", "survived", "drug x", "300 mg", "occurred on Jul. 1, 2021", and "male". Then, the digital literature intake and management circuit 144 may classify the terms "hospitalized" and "survived" as seriousness terms and/or phrases; the terms "drug x" and "300 mg" as medical product terms and/or phrases, the phrase "occurred on Jul. 1, 2021" as a date/time term and/or phrase; and the term "male" as a demographic term and/or phrase.

In some embodiments, the provider computing system 104 may use an AI model (e.g., a natural language processing (NLP) model, a large language model (LLM), a semantic text model, etc.) to interpret the linguistic section(s) of the digital literature file and determine the key terms and/or phrases of the linguistic section. In one example, the provider computing system 104 may utilize an NLP model to interpret the linguistic section(s) and select the key terms and/or phrases. NLP AI models use algorithms and machine learning techniques to analyze and extract meaning from text or speech. They break down sentences into smaller components, such as words or phrases, and identify the relationships between them. This helps them understand the context, sentiment, and intent behind the input. These models can perform various tasks, including language translation, sentiment analysis, text summarization, question answering, and chatbot interactions. In this regard, the provider computing system 104 may use an NLP AI model to interpret the linguistic sections of the digital literature file and determine key terms and/or phrases based on the retrieved or received data (e.g., the medical product data, the study data, the seriousness data, the adverse event codes, etc.).

In other embodiments, the provider computing system 104 may utilize other AI models (e.g., semantic text models, LLMs, recurrent neural networks (RNN), convolution neural networks, (CNN), Sequence-to-Sequence models, etc.) to digitally interpret the linguistic sections of the piece of digital literature and determine the key terms and/or phrases.

As described herein, each digital literature file may be associated with multiple pieces of digital literature and include one or more linguistic sections for each piece of digital literature. In this regard, after step 204, the provider computing system 104 may proceed to step 208 and/or step 212 for each piece of digital literature. For instance, the digital literature file may be associated with seven pieces of digital literature and include five linguistic section in Russian and two linguistic section in English. For each, digital linguistic section in Russian, the provider computing system 104 may proceed to step 208 and translate each to English (or receive a translation of each in English). Then, for all seven linguistic sections in English (e.g., after the translations take place), the provider computing system 104 may proceed to step 212 and determine key terms and/or phrases for each linguistic section or piece of literature. For example, the provider computing system 104 may determine key terms for the first piece of literature based on a first linguistic section; key terms for the second piece of literature based on a second linguistic section; and so on.

In other embodiments, after generating each digital literature data object, the provider computing system 104 may proceed to step 208 or 212, for each digital literature data object. For instance, the digital literature file may be associated with seven pieces of digital literature, and the provider computing system 104 may generate seven separate digital literature data objects. Then, for each digital literature data object (and associated linguistic section(s)), the provider computing system 104 may proceed to step 208 or step 212, depending on the language of the linguistic sections.

Once the provider computing system 104 has determined one or more key terms of the linguistic section(s), the provider computing system 104 may proceed to step 216 at which the provider computing system 104 ranks the piece of digital literature. In some embodiments, the provider computing system 104 may rank the piece of digital literature based on the number and breadth of groupings of the determined key terms. For example, a first piece of digital literature including a key term or phrase identifying a medical product (e.g., Drug x), a key term or phrase identifying a date/time (e.g., occurred on date 1), a key term or phrase identifying an adverse event (e.g., Heart attack), and a key term or phrase identifying a seriousness of resulted in death (e.g., the patient died) may be assigned the highest ranking (e.g., rank 1). In comparison, a second piece of digital literature including a key term or phrase identifying a medical product (e.g., Drug x), a key term or phrase identifying a date/time (e.g., occurred on date 1), a key term or phrase identifying an adverse event (e.g., Heart attack), and a key term or phrase identifying a seriousness of hospitalization (e.g., the patient was hospitalized but recovered) may be assigned the second highest ranking (e.g., rank 2). Moreover, a third piece of digital literature including a key term or phrase identifying a date/time (e.g., occurred on date 1), a key term or phrase identifying an adverse event (e.g., Heart attack), and a key term or phrase identifying a seriousness of non-serious (e.g., the patient was perfectly okay), but not having or including a key term or phrase identifying a medical product (e.g., Drug x), may be assigned the lowest ranking (e.g., rank 7).

In some embodiments, the rankings are relative amongst the pieces of digital literature included in the digital literature file. For instance, the provider computing system 104 may receive a digital literature file associated with four pieces of digital literature. Accordingly, at step 216, the provider computing system 104 may rank the piece of digital literature into one of four rankings (e.g., rank one (being most important or first to be reviewed), rank two (being second most important), rank three, and rank four). Further, the rankings may be determined based on the number and breadth of groupings of the key terms and/or phrases. For instance, a first piece of literature having key terms for the medical product grouping, the date/time grouping, the seriousness grouping, and the adverse event grouping may be ranked higher than a second piece of literature having terms for the medical product grouping, the date/time grouping, the seriousness grouping, but not the adverse event grouping. In another example, a third piece of literature having six key terms for the medical product grouping, two key terms for the date/time grouping, a key term for the seriousness grouping, and four key terms for the adverse event grouping may be ranked higher than a fourth piece of literature having five key terms for the medical product grouping, two key terms for the date/time grouping, a key term for the seriousness grouping, and four key terms for the adverse event grouping (e.g., due to having a higher number of key terms for the medical product grouping).

In some embodiments, each pieces of digital literature may be ranked based on the respective key terms and/or phrases as well as the received literature ranking preferences. For instance, the provider computing system 104 may receive literature ranking preference including requisite preferences of medical product and adverse event as well as optional preferences of study and date/time. Accordingly, a first piece of literature having key terms for the medical product grouping, the adverse event grouping, the study grouping, and the date/time grouping may be ranked higher than a second piece of literature having terms for the medical product grouping, the adverse event grouping, the seriousness grouping, but not the date/time grouping. Likewise, the second piece of literature may be ranked higher than a third piece of literature having terms for the medical product grouping, the seriousness grouping, the date/time grouping, but not the adverse event grouping (e.g., due to the adverse event grouping being a requisite preference).

In some embodiments, the pieces of digital literature may be further ranked on the type of seriousness identified in the seriousness grouping key terms and/or phrases. For instance, a first piece of literature having six key terms for the medical product grouping, two key terms for the date/time grouping, a key term for the seriousness grouping identifying a seriousness of resulted in death, and four key terms for the adverse event grouping may be ranked higher than a fourth piece of literature having seven key terms for the medical product grouping, two key terms for the date/time grouping, a key term for the seriousness grouping identifying a seriousness of hospitalized, and four key terms for the adverse event grouping (e.g., due to having a higher priority type of seriousness).

In this regard, in some embodiments, the highest ranking may be assigned to pieces of digital literature having a key term and/or phrase for each grouping as well as a seriousness key term and/or phrase matching the Seriousness of "resulted in death". Likewise, the second highest ranking may be assigned to pieces of digital literature having a key term and/or phrase for each grouping as well as a seriousness key term and/or phrase matching the Seriousness of "life-threatening".

In some embodiments, at step 216, the provider computing system 104 may rank each piece of digital literature or each digital literature data object of the digital literature file. For instance, the digital literature file may be associated with seven pieces of digital literature, and the provider computing system 104 may generate seven separate digital literature data objects. Then, at step 216, the provider computing system 104 may rank each digital literature data object or each piece of digital literature of the digital literature data object. In some embodiments, the ranking may be utilized by the provider computing system 104 to enable the order of display of the digital literature data objects on a user interface of one of the user computing devices 112. For instance, FIGS. 5A-5B shows a digital literature page 500 representing a single piece of digital literature and digital literature data object. In this regard, the provider computing system 104 may provide the digital literature data object to the respective user computing device 112 for display, and they may be displayed (e.g., on the digital literature page 500, on a listing of pieces of digital literature, tec.) in an order following the ranking. For instance, the user computing device 112 may first be navigated to a digital literature page 500 associated with the first highest-ranking piece of digital literature and/or digital literature data object. Then, in response to navigating to the next page (e.g., by pressing an arrow button 502), the user computing device 112 may be navigated to a second digital literature page 500 associated with the second highest-ranking piece of digital literature and/or digital literature data object. This may be repeated until the user computing device 112 has been navigated to a digital literature page 500 for each piece of digital literature and/or each digital literature data object. In other embodiments, the user computing device 112 may navigate to a digital literature line listing or chart (not shown) including a quick summary of each piece of intaken digital literature (e.g., name, key terms and/or phrases, title, ranking, etc.). The digital literature line listing may include the pieces of digital literature in the determined ranking such that the highest-ranking piece of digital literature is listed at the top of the digital literature line listing, the second highest-ranking piece of digital literature is listed directly below or adjacent the first highest ranking, piece of digital literature, and so on until the lowest-ranking piece of digital literature is at the bottom of the digital literature line listing.

Once the provider computing system 104 has ranked the piece of digital literature, the method 200 proceeds to step 220 at which the provider computing system 104 determines adverse event data based on the key terms and/or the linguistic section of the digital literature. In some embodiments, after ranking the piece of digital literature, the provider computing system 104 may determine if the piece of digital literature (e.g., the linguistic section of the piece of digital literature) meets the intake threshold based on the key terms and/or phrases and the case intake preferences (or the literature ranking preferences). For instance, the provider computing system 104 may receive intake preferences including three requisite preferences such as a medical product grouping, a date/time grouping, and an adverse event grouping. Further, the intake threshold may be set at 1 (or the highest value) indicating that each of the requisite preferences and/or optional preferences must be met for the case intake process to automatically start. In this regard, the provider computing system 104 may determine a first piece of literature has a key term and/or phrase in the medical product grouping, the date/time grouping, and the adverse event grouping and assign or rank the piece of digital literature the highest ranking (e.g., 1). Then, the provider computing system 104 may proceed to step 220. In comparison, the provider computing system 104 may determine a second piece of literature has a key term and/or phrase in the medical product grouping, the date/time grouping, but not the adverse event grouping and assign or rank the piece of digital literature the third rank (e.g., due to the missing adverse event grouping). In response, the provider computing system 104 may not proceed to step 220 and the method 200 may end.

In some embodiments, the provider computing system 104 may determine if the piece of digital literature (e.g., the linguistic section of the piece of digital literature) meets the intake the case intake preferences (or the literature ranking preferences) based on the key terms. For instance, the provider computing system 104 may receive intake preferences including three requisite preferences such as a medical product grouping, a date/time grouping, and an adverse event grouping. Accordingly, the provider computing system 104 may the provider computing system 104 may determine if a first piece of literature has a key term and/or phrase in the medical product grouping, the date/time grouping, and the adverse event grouping. In response to the piece of literature having each, the provider computing system 104 may determine the piece of digital literature fulfills or meets the case intake preferences and may proceed to step 220. In comparison, the provider computing system 104 may determine a second piece of literature has a key term and/or phrase in the medical product grouping, the date/time grouping, but not the adverse event grouping and determine the second piece of literature does not fulfill the case intake preferences. In response, the provider computing system 104 may not proceed to step 220 and the method 200 may end.

In this regard, in some embodiments, the provider computing system 104 may assign two rankings to each piece of digital literature including a digital literature ranking (e.g., at step 216) based on the literature ranking preferences and the key terms and/or phrases and a case intake ranking (e.g., before step 220) based on the case intake preferences and the key terms and/or phrases. In other embodiments, the digital literature ranking of step 216 may be utilized for ranking the literature and for determining if a case intake should take place. In this regard, after ranking the piece of digital literature, the provider computing system 104 may determine if the piece of literature meets the intake threshold based on the ranking determined at step 216.

In some embodiments, at step 220, the provider computing system 104 may assign one or more of the key terms and/or phrases to an adverse event data field. For instance, the key terms and/or phrases may include two phrases in the seriousness grouping including ("was not hospitalized" and "found dead at home"). Accordingly, based on the two phrases, the provider computing system 104 may assign the second key term and/or phrase to the seriousness: resulted in death. In another example, the key terms and/or phrases may include two terms in the seriousness grouping including ("Drug X—Capsule" and "300 mg"). Accordingly, based on the two terms, the provider computing system 104 may assign the key terms to the medical product field of the adverse event data: Drug X—Capsule, 300 mg. In this regard, this process may be repeated for each key term and/or phrase for each grouping (e.g., the medical product key terms may be used to determine the medical product field of the adverse event data, the study key terms may be used to determine the study field of the adverse event data, the seriousness key terms may be used to determine the seriousness field of the adverse event data, the adverse event key terms may be used to determine the adverse event term and/or code field of the adverse event data, and the like). In some embodiments, the reporter field of the adverse event data is assigned or generated as the authors of the piece of digital literature. For instance, the piece of digital literature may have authors John Smith and Terry Real. Accordingly, the reporter field of the adverse event data may be determined or generated as John Smith and Terry Real.

In some embodiments, at or after step 220, the provider computing system 104 may generate an adverse event intake data object (also referred to as an inbox item data object) and add the adverse event data to the adverse event intake data object. In some embodiments, the adverse event intake data object may be provided to the one of the user computing devices 112 to enable display (e.g., on an inbox item page, not shown) thereon and receive verification of each of the fields of the adverse event data or to receive additional fields, if each of the adverse event data fields are not supplied or determined. In some embodiments, if each of the adverse event fields are filled or supplied/determined based on the key terms and/or phrases, the provider computing system 104 may proceed automatically to step 224 and generate the case dataset.

In some embodiments, the provider computing system 104 may proceed to step 220, in response to receiving a request from one of the user computing devices 112 to do so. For instance, the user computing device 112 may review a piece of digital literature on the digital literature page 500 and decide the piece of digital literature represents one or more adverse events. Accordingly, the user may select a generate case dataset button (not shown), which may cause the user computing device 112 to generate and provide a request to intake the piece of digital literature as a case dataset.

Once the provider computing system 104 has determined adverse event data based on the key terms, the provider computing system 104 proceeds to step 224 at which the provider computing system 104 generates a case dataset including at least a portion of the adverse event data. For instance, the provider computing system 104 may generate a case dataset including the adverse event data determined based on the key terms and the adverse event data received from the user computing device 112 (e.g., the missing fields which were received from the user computing device 112). In another example, the provider computing system 104 may retrieve the medical product data of the medical product field from the medical product repository (not shown) and include the medical product data (e.g., product or drug identifier, dosage, trade name, route of administration, etc.) in the case data when generating the case dataset. In some embodiments, after step 224 and generating the case dataset, the provider computing system 104 may store the case dataset in the case repository 134. In this regard, the case data may include the adverse event information as well as other data pertaining to the ICSR such as the case contact and the case documents (e.g., the piece of literature). In some embodiments, the provider computing system 104 may generate the case data by transforming adverse event data that is in an incorrect format into a correct format (e.g., "SE" to "Sweden"). In this regard, the case data may be generated to include the corrected adverse event data and the medical product data of the potentially matching medical product.

In some embodiments, once the provider computing system 104 has generated the case dataset, the provider computing system 104 outputs the case dataset. For instance, the provider computing system 104 may output the case dataset to one or more of the partner computing systems (e.g., the FDA ESG) 108 or the user computing devices 112. In one example, the case dataset may be stored in the form of an E2B XML file and provided to one or more of the partner computing systems 108 or the user computing devices 112 via an AS2 Gateway communication or an email. Accordingly, the provider computing system 104 may generate an email including the case dataset as a part thereof (e.g., as Council for International Organizations of Medical Sciences (CIOMS) II PDF file as an attachment) and output the generated email to an email address associated with the partner computing system 104. In another example, the provider computing system 104 may generate an AS2 gateway transmission including the case dataset as a part thereof (e.g., as E2B XML (R2 or R3) attachments) and output the generated AS2 Gateway transmission to a specified IP address associated with the partner computing system 108.

In some embodiments, the provider computing system 104 may repeat steps 208-224 for each piece of digital literature in the digital file. For instance, the provider computing system 104 may determine key terms based on a first piece of digital literature, rank the first piece of digital literature, generate adverse event data based on the key terms, generate a case dataset including at least a portion of the adverse event data, and output the case dataset. Then, the For instance, the provider computing system 104 may determine key terms based on a second piece of digital literature, rank the second piece of digital literature, generate adverse event data based on the key terms, generate a second case dataset including at least a portion of the adverse event data, and output the second case dataset.

Figure 3:
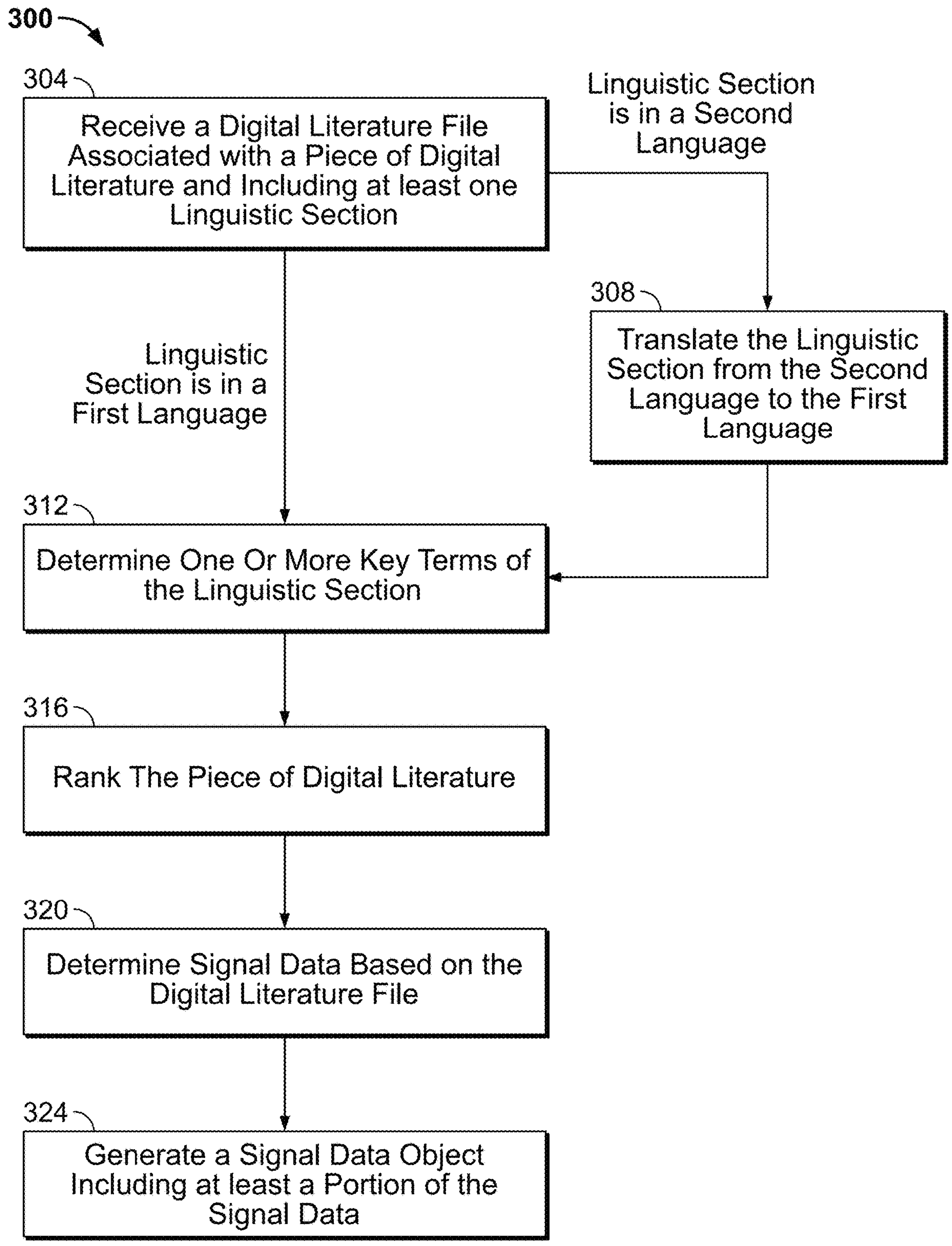
FIG. 3 may be a flow diagram of a method for generating a signal data object based on digital literature, according to an example embodiment.

Referring now to FIG. 3, a method 300 of generating a signal data object based on digital medical literature is shown, according to an example embodiment. While different overall, it should be understood that any steps or discussion of the method 300 may be applied or included within the method 200, and vice versa, and that such combinations are included within the scope of the present disclosure. For example, the method 200 may include any of the steps 304-324, after or before any steps included in the method 200, and the method 300 may include any of the steps 204-224 after or before any of the steps included in the method 300. For instance, as described herein, a digital literature file may be associated with multiple pieces of literature and include one or more linguistic sections for each piece of literature. Accordingly, for a first piece of digital literature, the provider computing system 104 may proceed through method 200 and generate a case dataset. Then, for a second piece of digital literature in the same digital literature file, the provider computing system 104 may proceed through method 200, but generate a signal data object (e.g., but perform steps 320 and 324 in place of the steps 220 and 224, respectfully). In this regard, it should be understood that such combinations are included within the scope of the present disclosure. Method 300 can be carried out by the system of FIG. 1. More particularly, the method 300 can be carried out by the processing circuit 128 of the provider computing system 104 and through communication with the user computing devices 112 and/or the partner computing systems 108.

Method 300 commences at step 304 at which the provider computing system 104 receives a digital literature file associated with a piece of digital literature and including at least one linguistic section. In some embodiments, the digital literature file is received from the digital literature file repository 114, in response to generating and providing a request for one or more pieces of digital literature. In other embodiment, the digital literature file is received from one of the user computing devices 112. As described herein, the digital literature file may be a text file (e.g., an RIS file, a DocX/Doc file, a txt file, an HTML file, an XML file, etc.) identifying one or more pieces of digital literature and having a linguistic section for each. For example, the received digital literature file may be an RIS file including one or more linguistic sections for 15 separate pieces of digital literature (e.g., a title, authors, and abstract for each of the 15 pieces of digital literature, etc.).

Additionally, each linguistic section for each piece of digital literature may be in a multitude of languages. In on example, a digital literature file may include a linguistic section for 15 separate pieces of digital literature. Further, each linguistic section may be in a different language (e.g., the first linguistic section of the first piece of digital literature is in a first language, the second linguistic section of the second piece of digital literature is in a second language, and so on). Further, before or at step 304, the provider computing system 104 may receive a system or language of preference (e.g., English) which each linguistic section is to be in. For example, the provider computing system 104 may receive a language of preference from one of the user computing devices 112. In other embodiments, the language of preference may be set, by the provider computing system 104, based on a medical product associated with the customer and/or the digital literature file (e.g., based on the country within which the medical product is registered, etc.).

In some embodiments, before or at step 304, the provider computing system 104 may receive literature ranking preferences and/or signal investigation preferences from one of the user computing devices 112. As described herein, the literature ranking preferences may include one or more requisite preferences and one or more optional preferences which are selected or set by the user computing device 112 and provide for the ranking of the piece of digital literature of the digital literature file. In this regard, the ranking preferences may each be or identify one or more classifications or groupings of the digital literature that either must be matched or should be matched to indicate the piece of digital literature is a priority to be reviewed and checked for adverse event data or signal data. For instance, at or before step 304, the provider computing system 104 may receive requisite preferences of seriousness and medical product, and an optional preference of date/time. Accordingly, when ranking or comparing each piece of digital literature of the digital literature file, the provider computing system 104 may rank each piece of digital literature based on the linguistic section for the piece of digital literature having a seriousness and a medical product as well as having a date/time (as identified in the key terms and/or phrases).

Likewise, the signal investigation preferences may include one or more requisite preferences and one or more optional preferences which are selected or set by the user computing device 112 and provide for the situation at which the digital literature file is automatically investigated for a potential signal. In this regard, the case intake preferences may each be or identify one or more pieces of case data or adverse event data that either must be matched or should be matched to indicate the digital literature file more likely than not identifies a potential signal that should be investigated. For instance, at or before step 304, the provider computing system 104 may receive requisite preferences of date/time, adverse event, and medical product. Accordingly, when determining if the digital literature file includes potential signal data and should be intaken (e.g., a signal data object should be generated), the provider computing system 104 may rank the digital literature file based on the key terms and/or the linguistic sections therein identifying an adverse event, a medical product, and a date/time (as identified by key terms being grouped into the medical product grouping and the date/time grouping).

In some embodiments, the case intake preferences further include a signal threshold value. The threshold value may identify the number of potential cases or pieces of literature at which the provider computing system 104 can automatically proceed with determining signal data based on the piece(s) of digital literature (and generating a signal data object) (vs. providing the piece of digital literature to the user computing device 112 for manual review). For instance, the user computing device 112 may provide signal investigation preferences, to the provider computing system 104, that include a threshold value of 12. Accordingly, the provider computing system 104 may not automatically determine signal data based on the digital literature file unless the provider computing system 104 determines or finds a key term or phrase matching the requisite preferences and the optional preferences in 12 separate pieces of literature.

In some embodiments, at or after step 304, the provider computing system 104 may further generate a digital literature data object for each piece of digital literature associated with the digital literature file and assign or add each linguistic section to the respective digital literature data object. For instance, the digital literature file may be associated with (and include linguistic section(s)) with 15 pieces of digital literature. Then, at or after step 304, the provider computing system 104 may generate 15 separate digital literature data objects for each piece of digital literature and add the linguistic section(s) of each to the digital literature data object. Further, based on the digital literature file and the linguistic sections therein, the provider computing system 104 may determine or create one or more fields for each digital literature data object. For example, the provider computing system 104 may generate a digital literature data object and create a digital object identifier (DOI) field, a title field, a journal or publication title field, a date of publication field, a language field, a citation field, and/or an original abstract field based on the linguistic sections for the piece of the digital literature.

If, at step 304, the linguistic section is not in the language of preference (or a first language, the method 204 may proceed to step 308, at which the provider computing system 104 translates the linguistic section from the first language to the second language. For example, the provider computing system 104 may determine the linguistic section is to be translated to English due to the customer being based in the USA and may automatically translate the linguistic section to English, as will be described further herein. For example, the provider computing system 104 may use rule-based machine translation (e.g., dictionary-based machine translation using a translation repository (not shown)), transfer-based machine translation, interlingual machine translation, statistical machine translation, example-based machine translation, hybrid machine translation, and/or Neural machine translation using a neural network to translate the linguistic section from the current language to the specified language.

In other embodiments, at step 308, the provider computing system 104 may output or provide the linguistic section to one of the partner computing systems 108 associated with a translation service. Then, in response, the provider computing system 104 may receive the linguistic section in the specified language (e.g., English). In some embodiments, the linguistic section may be provided to a different partner computing system 108, dependent on the language of the linguistic section. For example, a linguistic section in Chinese may be provided to a Chinese translation service associated with a first partner computing system 108. In comparison, a linguistic section in French may be provided to a French translation service associated with a second partner computing system 108. Likewise, in some embodiments, the provider computing system 104 may translate linguistic sections in specific languages (e.g., French, Greek, Spanish, etc.) and may output linguistic sections in other specific languages to the partner computing system(s) 108 for translation (e.g., Chinese, Japanese, Arabic, Russian, etc.).

If, at step 304, the linguistic section is in the specified language or after step 308, the provider computing system 104 may proceed to step 312 at which the provider computing system 104 determines one or more key terms of the linguistic section(s). As described herein, the key terms may be terms or phrases associated with adverse events or potential signals such as medical product terms or phrases (e.g., medical product names or aliases or identifiers (e.g., drug x, drug x—10 mg, Ibuprofen, generic Ibuprofen, company 123 Ibuprofen, national drug code (NDC) 123, etc.), seriousness terms or phrases (e.g., death, died, hospitalized, survived, fatal, defect, birth defect, etc.), study terms or phrases or identifiers (clinical study, clinical trial, phase III, phase 3, phase, study ID 123, etc.), demographic terms (e.g., age, gender, ethnicity, married, zip code, etc.), patient terms (name, date of birth, address, zip code, etc.), reporter terms (e.g., reported by, country of origin, country, etc.), adverse event terms (e.g., MedDRA codes, MedDRA terms, cancer, etc.), and/or date/time terms (e.g., occurred on, happened on, onset, Jul. 1, 2021, July, 19$^{th}$ century, etc.). In other embodiments, other key terms and/or phrases are possible such as medical device terms and/or phrases, vaccine terms and/or phrases, cosmetic terms and/or phrases, and the like.

In some embodiments, the provider computing system 104 may retrieve data for each grouping or classification of key terms such as medical product data (e.g., from a medical product repository (not shown)), study data (e.g., from a study repository (not shown)), seriousness data (e.g., from a seriousness repository (not shown)), and/or adverse event code or term data ((e.g., from a MedDRA repository (not shown)). Then, the provider computing system 104 may determine key terms or phrases of the linguistic section by matching the terms or phrases of the linguistic section with the same terms or phrases in the retrieved data.

In some embodiments, the provider computing system 104 may further distinguish between or classify the determined terms and/or phrases into one or more classifications (e.g., medical product terms and/or phrases, seriousness terms and/or phrases, study terms and/or phrases, demographic terms and/or phrases, etc.). For example, the provider computing system 104 may determine multiple key terms including "hospitalized", "survived", "drug x", "300 mg", "occurred on Jul. 1, 2021", and "male". Then, the digital literature intake and management circuit 144 may classify the terms "hospitalized" and "survived" as seriousness terms and/or phrases; the terms "drug x" and "300 mg" as medical product terms and/or phrases, the phrase "occurred on Jul. 1, 2021" as a date/time term and/or phrase; and the term "male" as a demographic term and/or phrase.

In some embodiments, the provider computing system 104 may use an AI model (e.g., a natural language processing (NLP) model, a large language model (LLM), a semantic text model, etc.) to interpret the linguistic section(s) of the digital literature file and determine the key terms and/or phrases of the linguistic section. In one example, the provider computing system 104 may utilize an NLP model to interpret the linguistic section(s) and select the key terms and/or phrases. NLP AI models use algorithms and machine learning techniques to analyze and extract meaning from text or speech. They break down sentences into smaller components, such as words or phrases, and identify the relationships between them. This helps them understand the context, sentiment, and intent behind the input. These models can perform various tasks, including language translation, sentiment analysis, text summarization, question answering, and chatbot interactions. In this regard, the provider computing system 104 may use an NLP AI model to interpret the linguistic sections of the digital literature file and determine key terms and/or phrases based on the retrieved or received data (e.g., the medical product data, the study data, the seriousness data, the adverse event codes, etc.).

In other embodiments, the provider computing system 104 may utilize other AI models (e.g., semantic text models, LLMs, recurrent neural networks (RNN), convolution neural networks, (CNN), Sequence-to-Sequence models, etc.) to digitally interpret the linguistic sections of the piece of digital literature and determine the key terms and/or phrases.

As described herein, each digital literature file may be associated with multiple pieces of digital literature and include one or more linguistic sections for each piece of digital literature. In this regard, after step 304, the provider computing system 104 may proceed to step 308 and/or step 312 for each piece of digital literature. For instance, the digital literature file may be associated with seven pieces of digital literature and include five linguistic section in Russian and two linguistic section in English. For each, digital linguistic section in Russian, the provider computing system 104 may proceed to step 308 and translate each to English (or receive a translation of each in English). Then, for all seven linguistic sections in English (e.g., after the translations take place), the provider computing system 104 may proceed to step 312 and determine key terms and/or phrases for each linguistic section or piece of literature. For example, the provider computing system 104 may determine key terms for the first piece of literature based on a first linguistic section; key terms for the second piece of literature based on a second linguistic section; and so on.

In other embodiments, after generating each digital literature data object, the provider computing system 104 may proceed to step 308 or 312, for each digital literature data object. For instance, the digital literature file may be associated with seven pieces of digital literature, and the provider computing system 104 may generate seven separate digital literature data objects. Then, for each digital literature data object (and associated linguistic section(s)), the provider computing system 104 may proceed to step 308 or step 312, depending on the language of the linguistic sections.

Once the provider computing system 104 has determined one or more key terms of the linguistic section(s), the provider computing system 104 may proceed to step 316 at which the provider computing system 104 ranks the piece of digital literature. In some embodiments, the provider computing system 104 may rank the piece of digital literature based on the number and breadth of groupings of the determined key terms. For example, a first piece of digital literature including a key term or phrase identifying a medical product (e.g., Drug x), a key term or phrase identifying a date/time (e.g., occurred on date 1), a key term or phrase identifying an adverse event (e.g., Heart attack), and a key term or phrase identifying a seriousness of resulted in death (e.g., the patient died) may be assigned the highest ranking (e.g., rank 1). In comparison, a second piece of digital literature including a key term or phrase identifying a medical product (e.g., Drug x), a key term or phrase identifying a date/time (e.g., occurred on date 1), a key term or phrase identifying an adverse event (e.g., Heart attack), and a key term or phrase identifying a seriousness of hospitalization (e.g., the patient was hospitalized but recovered) may be assigned the second highest ranking (e.g., rank 2). Moreover, a third piece of digital literature including a key term or phrase identifying a date/time (e.g., occurred on date 1), a key term or phrase identifying an adverse event (e.g., Heart attack), and a key term or phrase identifying a seriousness of non-serious (e.g., the patient was perfectly okay), but not having or including a key term or phrase identifying a medical product (e.g., Drug x), may be assigned the lowest ranking (e.g., rank 7).

In some embodiments, the rankings are relative amongst the pieces of digital literature included in the digital literature file. For instance, the provider computing system 104 may receive a digital literature file associated with four pieces of digital literature. Accordingly, at step 316, the provider computing system 104 may rank the piece of digital literature into one of four rankings (e.g., rank one (being most important or first to be reviewed), rank two (being second most important), rank three, and rank four). Further, the rankings may be determined based on the number and breadth of groupings of the key terms and/or phrases. For instance, a first piece of literature having key terms for the medical product grouping, the date/time grouping, the seriousness grouping, and the adverse event grouping may be ranked higher than a second piece of literature having terms for the medical product grouping, the date/time grouping, the seriousness grouping, but not the adverse event grouping. In another example, a third piece of literature having six key terms for the medical product grouping, two key terms for the date/time grouping, a key term for the seriousness grouping, and four key terms for the adverse event grouping may be ranked higher than a fourth piece of literature having five key terms for the medical product grouping, two key terms for the date/time grouping, a key term for the seriousness grouping, and four key terms for the adverse event grouping (e.g., due to having a higher number of key terms for the medical product grouping).

In some embodiments, each pieces of digital literature may be ranked based on the respective key terms and/or phrases as well as the received literature ranking preferences. For instance, the provider computing system 104 may receive literature ranking preference including requisite preferences of medical product and adverse event as well as optional preferences of study and date/time. Accordingly, a first piece of literature having key terms for the medical product grouping, the adverse event grouping, the study grouping, and the date/time grouping may be ranked higher than a second piece of literature having terms for the medical product grouping, the adverse event grouping, the seriousness grouping, but not the date/time grouping. Likewise, the second piece of literature may be ranked higher than a third piece of literature having terms for the medical product grouping, the seriousness grouping, the date/time grouping, but not the adverse event grouping (e.g., due to the adverse event grouping being a requisite preference).

In some embodiments, the pieces of digital literature may be further ranked on the type of seriousness identified in the seriousness grouping key terms and/or phrases. For instance, a first piece of literature having six key terms for the medical product grouping, two key terms for the date/time grouping, a key term for the seriousness grouping identifying a seriousness of resulted in death, and four key terms for the adverse event grouping may be ranked higher than a fourth piece of literature having seven key terms for the medical product grouping, two key terms for the date/time grouping, a key term for the seriousness grouping identifying a seriousness of hospitalized, and four key terms for the adverse event grouping (e.g., due to having a higher priority type of seriousness).

In this regard, in some embodiments, the highest ranking may be assigned to pieces of digital literature having a key term and/or phrase for each grouping as well as a seriousness key term and/or phrase matching the Seriousness of "resulted in death". Likewise, the second highest ranking may be assigned to pieces of digital literature having a key term and/or phrase for each grouping as well as a seriousness key term and/or phrase matching the Seriousness of "life-threatening".

In some embodiments, at step 316, the provider computing system 104 may rank each piece of digital literature or each digital literature data object of the digital literature file. For instance, the digital literature file may be associated with seven pieces of digital literature, and the provider computing system 104 may generate seven separate digital literature data objects. Then, at step 316, the provider computing system 104 may rank each digital literature data object or each piece of digital literature of the digital literature data object. In some embodiments, the ranking may be utilized by the provider computing system 104 to enable the order of display of the digital literature data objects on a user interface of one of the user computing devices 112. For instance, FIG. 5A-5B shows the digital literature page 500 representing a single piece of digital literature and digital literature data object. In this regard, the provider computing system 104 may provide the digital literature data object to the respective user computing device 112 for display, and they may be displayed (e.g., on the digital literature page 500, on a listing of pieces of digital literature, tec.) in an order following the ranking. For instance, the user computing device 112 may first be navigated to a digital literature page 500 associated with the first highest-ranking piece of digital literature and/or digital literature data object. Then, in response to navigating to the next page (e.g., by pressing an arrow button 502), the user computing device 112 may be navigated to a second digital literature page 500 associated with the second highest-ranking piece of digital literature and/or digital literature data object. This may be repeated until the user computing device 112 has been navigated to a digital literature page 500 for each piece of digital literature and/or each digital literature data object. In other embodiments, the user computing device 112 may navigate to a digital literature line listing or chart (not shown) including a quick summary of each piece of intaken digital literature (e.g., name, key terms and/or phrases, title, ranking, etc.). The digital literature line listing may include the pieces of digital literature in the determined ranking such that the highest-ranking piece of digital literature is listed at the top of the digital literature line listing, the second highest-ranking piece of digital literature is listed directly below or adjacent the first highest ranking, piece of digital literature, and so on until the lowest-ranking piece of digital literature is at the bottom of the digital literature line listing.

Once the provider computing system 104 has ranked the piece of digital literature, the method 300 proceeds to step 320 at which the provider computing system 104 determines potential signal based digital literature file (e.g., based on the linguistic section and/or key terms for each piece of digital literature). In some embodiments, after ranking the piece of digital literature, the provider computing system 104 may determine if the pieces of digital literature meet the signal threshold. For instance, the provider computing system 104 may receive signal investigation preferences including three requisite preferences such as a medical product grouping, a date/time grouping, and an adverse event grouping. Further, the signal threshold may be set at 12 (or the highest value) indicating that twelve separate pieces of literature are required to determine signal data. In this regard, the provider computing system 104 may determine a digital literature file has twelve separate pieces of literature with a key term and/or phrase in the medical product grouping, the date/time grouping, and the adverse event grouping. Then, the provider computing system 104 may proceed to step 420. In another example, the provider computing system 104 may determine a second digital literature file has five separate pieces of literature with a key term and/or phrase in the medical product grouping, the date/time grouping, and the adverse event grouping, and seven separate pieces of literature with a key term and/or phrase in the medical product grouping, the date/time grouping, but no key terms/phrases in the adverse event grouping. In response, the provider computing system 104 may not proceed to step 320 and the method 300 may end.

In some embodiments, at step 320, the provider computing system 104 may assign one or more of the key terms and/or phrases to a signal data field. For instance, the key terms and/or phrases may include two phrases in the seriousness grouping including ("was not hospitalized" and "found dead at home"). Accordingly, based on the two phrases, the provider computing system 104 may assign the second key term and/or phrase to the seriousness: resulted in death. In another example, the key terms and/or phrases may include two terms in the seriousness grouping including ("Drug X—Capsule" and "300 mg"). Accordingly, based on the two terms, the provider computing system 104 may assign the key terms to the medical product field of the signal data: Drug X—Capsule, 300 mg. In this regard, this process may be repeated for each key term and/or phrase for each grouping (e.g., the medical product key terms may be used to determine the medical product field of the signal data, the study key terms may be used to determine the study field of the signal data, the seriousness key terms may be used to determine the seriousness field of the signal data, the adverse event key terms may be used to determine the adverse event term and/or code field of the signal data, and the like). In some embodiments, the reporter field of the signal data is assigned or generated as the authors of the piece of digital literature. For instance, the piece of digital literature may have authors John Smith and Terry Real. Accordingly, the reporter field of the signal data may be determined or generated as John Smith and Terry Real.

In some embodiments, the provider computing system 104 may further retrieve one or more cases from the case repository 134 and generate the signal data based on the digital literature file and the retrieved case datasets. In some embodiments, prior to step 320, the provider computing system 104 may determine case data and generate a case dataset for each of the pieces of literature (e.g., as described with regard to steps 220-224). The provider computing system 104 may then determine the signal data based on the retrieved and generated case datasets.

In some embodiments, the provider computing system 104 may proceed to step 320, in response to receiving a request from one of the user computing devices 112 to do so. For instance, the user computing device 112 may review a piece of digital literature on the digital literature page 500 and decide the piece of digital literature (as well as other literature of the digital literature file) represent a potential signal. Accordingly, the user may select a generate signal button (not shown), which may cause the user computing device 112 to generate and provide a request to intake the piece of digital literature file as a potential signal.

Once the provider computing system 104 has determined signal data based on the digital literature file, the provider computing system 104 proceeds to step 324 at which the provider computing system 104 generates a signal data object including at least a portion of the signal data. For instance, the provider computing system 104 may generate a signal data object including the signal data (e.g., the adverse event and the medical product of each piece of literature or case dataset) and including each of the generated and received case datasets. In some embodiments, after step 324 and generating the case dataset, the provider computing system 104 may store the signal data object in the signal repository 135. In this regard, the signal data may include the medical product and the adverse event of each piece of literature as well as other data pertaining to the signal such as the reporter(s), the location(s), and the like.

In some embodiments, once the provider computing system 104 has generated the signal, the provider computing system 104 may generate a report or digital document including at least a portion of the signal data object and output the report. For instance, the provider computing system 104 may output the report to one or more of the partner computing systems (e.g., the FDA ESG) 108 or the user computing devices 112.

Referring now to FIGS. 4A-4B, a digital literature file 400 is shown according to an example embodiment. The digital literature file 400 is shown as an RIS file including multiple linguistic sections for a first piece of literature. For instance, the digital literature file 400 is shown to include a TY tag or header, a title header linguistic section including the title of the piece of literature ("Ethnobotanical Records . . . "), a accession number (AN) linguistic section, an abstract (AB) linguistic section including the abstract of the piece of literature, a Journal/Periodical name (JF) linguistic section, three author (AU) linguistic sections including the names of each author of the piece of literature, an author address (AD) linguistic section, and other linguistic sections which are each identified with a tag or header. While only a portion of the digital literature file 400 is shown, it should be understood that the digital literature file 400 may include the shown linguistic sections for each piece of digital literature included in the digital literature file 400. For instance, the digital literature file 400 may include the above-referenced and shown linguistic sections for 15 separate pieces of literature associated with the digital literature file 400.

Referring now to FIGS. 5A-5B, a user interface shown and displayed to the user of the one or more user computing devices 112 during the method 200 and/or 300 is shown, according to an example embodiment. As described herein, the user interface of FIGS. 5A-5B may be one or more of a web interface generated by the provider computing system 104 and rendered by each of the user computing devices 112 as part of a web application or a graphical user interface downloaded and generated by each of the user computing devices 112 as part of a software application (e.g., a mobile application, etc.). Further, the user interface shown on FIGS. 5A-5B allows for communication between the user) and the provider computing system 104 via the respective user computing device 112 (specifically via the I/O circuit 180, respectfully). Through interaction with the user interface, the user may provide user input, feedback, and other data requested by the provider computing system 104. In this regard, it should be understood that each interaction described herein by the user with the user interface of FIGS. 5A-5B may be provided to one or more of the user computing devices 112 and then transmitted to the provider computing system 104 and that each action described herein as occurring to the respective user computing device 112 (e.g., navigating to a certain page, generating a popup, etc.) may be performed by the provider computing system 104.

Referring now to FIGS. 5A-5B, the digital literature page 500 which can be displayed on a display the I/O circuit 180 of the user computing device 112, is shown. In general, the digital literature page 500 provides the user an interface to view, manage, and take action on a specific piece of digital literature of the digital literature page 500. As shown, the digital literature page 500 includes the arrow or next button 502, a details or overview section 504, an original abstract section 508, and a translated abstract section 512. To render or generate the digital literature page 500 on the user computing device 112, the provider computing system 104 may provide each of the digital literature data objects including the linguistic sections, ranking, and key terms/phrases of each to the user computing device 112 for display thereon. Further, as described herein, the provider computing system via the digital literature page 500, may provide the multiple digital literature pages 500 in the order of the ranking of each. For instance, the digital literature page 500 for the highest-ranking piece of digital literature may first be displayed on the user computing device 112. Then, after selecting the next arrow button 502, the digital literature page 500 for the second highest-ranking piece of digital literature may be displayed on the user computing device 112. This process may be repeated until the digital literature page 500 for the lowest-ranking piece of digital literature is displayed on the user computing device 112.

The details or overview section 504 provides the user of the respective user computing device 112 with an interface to manage and review the digital literature data of the piece of digital literature of the digital literature page 500. As shown, the details section 504 includes a DOI field, a title field, an abbreviated journal title field, a date of publication field, a language field, a citation field, and a search term field.

The original abstract section 508 provides the user of the respective user computing device 112 with an interface to manage and review the abstract linguistic section of the piece of digital literature in its original language. For instance, the original abstract section 508 may include the abstract of the piece of digital literature in a first language (e.g., Turkish). In comparison, the translated abstract section provides the user of the respective user computing device 112 with an interface to manage and review the abstract linguistic section of the piece of digital literature in the specified language. For instance, the translated abstract section 512 may include the abstract of the piece of digital literature in a second language (e.g., English) after being translated from the first language.

Still referring to FIGS. 5A-5B, the translated abstract section 512 is shown to include one or more terms and phrases, with the key terms and/or phrases highlighted by the provider computing system 104. In this regard, the provider computing system 104 may provide the key terms to the user computing device 112 to enable display and highlight or emphasizing on the user interface. Further, as shown, the key terms are highlighted or colored specific colors based on the groups within which the key terms are grouped or classified. For instance, as shown, key terms that are grouped in the medical product grouping have been highlighted in light blue or blue (e.g., "Pembrolizumab", "200 mg". Key terms that are grouped in the seriousness grouping are highlighted in yellow (e.g., "survival" "no fatal events", "safety" "grades 3-4", etc.). Key terms that are grouped in the adverse event grouping are highlighted in red (e.g., "endometrial cancer" "events", "toxicity" "solid tumor", etc.). Key terms that are grouped in the demographic or patient grouping are highlighted in green (e.g., "patients", "age", etc.). In other embodiments, other colors may be utilized by the provider computing system 104 (e.g., red for seriousness, etc.). In some embodiments, the provider computing system 104 may emphasize or highlight the key terms on the translated abstract section 512 in other ways. For instance, the provider computing system 104 may bold, start (e.g., drug x*), or underline. In another example, the provider computing system 104 may color the terms themselves (as compared to highlighting the terms).

The embodiments described herein have been described with reference to the drawings. The drawings illustrate certain details of specific embodiments that implement the systems, methods, and programs described herein. However, describing the embodiments with drawings should not be construed as imposing on the disclosure any limitations that may be present in the drawings.

It should be understood that no claim element herein is to be construed under the provision of 35 U.S.C § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexors, registers, capacitors, inductors, diodes, wiring, and so on.

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other embodiments, two or more processors may be coupled via a bus to enable independent, parallel, pipelined, or multi-threaded instruction execution. Each processor may be implemented as one or more general purpose processors, application specific integrated circuits (ASICs), field programmable gate arrays (FPGAs), digital signal processors (DSPs), or other suitable electronic data processing components structured to execute instructions provided by the memory. The one or more processors may take the form of a single core processor, a multi-core processor (e.g., dual core, quad core, etc.), microprocessor, etc. In some embodiments, the one or more processors may be external to the apparatus. For example, the one or more processors may be a remote processor (e.g., a cloud-based processor). Alternatively or additionally, the one or more processors may be internal and/or local to the apparatus. In this regard, a circuit or components thereof may be disposed locally (e.g., as part of a local server, a local computing system) or remotely (e.g., as part of a remote server such as a cloud-based server). To that end, a "circuit" as described herein may include components that are distributed across one or more locations. Further, each of the circuits described herein may be distributed across one or more locations (e.g., each as part of one or more remote servers).

An example system for implementing the overall system or portions of the embodiments might include a general purpose computing device in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile storage media may take the form of ROM, flash memory (e.g., flash memory such as NAND, 3D NAND, NOR, 3D NOR), EEPROM, MRAM, magnetic storage, hard disks, optical disks, etc. Combinations of the above are also included within the scope of machine-readable media. In this regard, machine-executable instructions comprise, for example, instructions and data which cause a general purpose computer, special purpose computer, or special purpose processing machine to perform a certain function or group of functions. Each respective memory device may be operable to maintain or otherwise store data relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, a joystick, or other input devices performing a similar function. Comparatively, the term "output device," as described herein, may include any type of output device including, but not limited to, a computer monitor, printer, facsimile machine, or other output devices performing a similar function.

It should be noted that the term "field," as described herein may include any form of an input field through which the user interfaces shown and described may receive input from a user of a computing device. For instance, the term "field" may include a text field, a drop-down box and selectable options, a list box, a lookup box, a search bar, an icon, one or more checkboxes, one or more radio buttons, a button, a toggle, a date field, a slider, and the like. Further, each "field" may include and/or receive data that may be associated with a data object as described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes, and omissions may be made in the design, operating conditions and embodiment of the embodiments without departing from the scope of the present disclosure as expressed in the appended claim.

What is claimed is:

1. A method for multilingual data processing comprising:

receiving, by the provider computing system, a digital file associated with a first piece of digital literature and a second piece of digital literature, wherein the digital file includes a first linguistic section in a first language associated with the first piece of digital literature and a second linguistic section in the first language associated with the second piece of digital literature, and wherein the digital file is a Research Information System (RIS) file;

translating, by the provider computing system, the first linguistic section from the first language to a second language to determine a first translated linguistic section;

translating, by the provider computing system, the second linguistic section from the first language to a second language to determine a second translated linguistic section;

determining, by the provider computing system, one or more first key terms of the first translated linguistic section that relate to at least one classification using a large language model (LLM), wherein the one or more first key terms are in the second language;

determining, by the provider computing system, one or more second key terms of the second translated linguistic section that relate to the at least one classification using the LLM, wherein the one or more second key terms are in the second language;

ranking, by the provider computing system, the first piece of digital literature based on the one or more first key terms, wherein the first piece of digital literature is ranked as a first rank;

ranking, by the provider computing system, the second piece of digital literature based on the one or more second key terms, wherein the second piece of digital literature is ranked as a second rank, and wherein the first rank is higher than the second rank;

determining, by the provider computing system and in response to the first rank being higher than the second rank, adverse event data based on the one or more first key terms;

generating, by the provider computing system, a case dataset including at least a portion the adverse event data; and outputting, by the provider computing system, the case dataset.

2. The method of claim 1, further comprising:

receiving, by a provider computing system, an intake threshold and at least one case intake preference including a requisite preference;

determining, by the provider computing system, the second translated linguistic section does not fulfill the intake threshold based on the requisite preference and the one or more second key terms; and determining, by the provider computing system and in response to the second translated linguistic section not fulfilling the intake threshold, the first translated linguistic section fulfills the intake threshold based on the requisite preference and the one or more first key terms.

3. The method of claim 2, wherein the requisite preference identifies at least one of: a seriousness, a medical product, or a study.

4. The method of claim 2, wherein the requisite preference identifies a seriousness, wherein the one or more first key terms identify a seriousness, and wherein determining the first translated linguistic section fulfills the intake threshold based on the requisite preference and the one or more first key terms comprises:

determining, by the provider computing system, the seriousness of the requisite preference matches the seriousness of the one or more first key terms; and determining, by the provider computing system and in response to the second translated linguistic section not fulfilling the intake threshold, the first translated linguistic section fulfills the intake threshold based on the seriousness of the requisite preference matching the seriousness of the one or more first key terms.

5. The method of claim 4, wherein the at least one classification includes a first classification and a second classification, and wherein determining the one or more first key terms comprises:

classifying, by the provider computing system, portions of the first translated linguistic section into at least one of: the first classification or the second classification;

retrieving, by the provider computing system, first classification data associated with the first classification from a first repository of the provider computing system;

retrieving, by the provider computing system, second classification data associated with the second classification from a second repository; and determining, by the provider computing system, the one or more first key terms by using the LLM to match the portions of the first translated linguistic section with at least one of: the first classification data or the second classification data.

6. The method of claim 5, wherein the first classification is a medical product classification, wherein the first classification data is medical product data, wherein the second classification is an adverse event term classification, and wherein the second classification data is adverse event term data.

7. The method of claim 1, further comprising:

outputting, by the provider computing system, the first linguistic section of the digital file and the first translated linguistic section to a user computing device to enable display on a user interface, wherein the user interface includes an original linguistic section including the first linguistic section in the first language and a translated section including the first translated linguistic section in the second language.

8. The method of claim 7, wherein the one or more first key terms of the translated section are highlighted.

9. The method of claim 7, wherein the one or more first key terms include a third key term and a fourth key term, and wherein determining the one or more first key terms comprises:

classifying, by the provider computing system, a first portion of the first translated linguistic section into a first classification;

retrieving, by the provider computing system, first classification data associated with the first classification from a first repository of the provider computing system;

determining, by the provider computing system, the third key term by matching the first portion of the first translated linguistic section with the first classification data;

classifying, by the provider computing system, a second portion of the first translated linguistic section into a second classification;

retrieving, by the provider computing system, second classification data associated with the second classification from a second repository; and determining, by the provider computing system, the fourth key term by matching the second portion of the first translated linguistic section with the second classification data.

10. The method of claim 9, wherein the third key term of the translated section is highlighted in a first color associated with the first classification, and wherein the fourth key term of the translated section is highlighted in a second color associated with the second classification, wherein the first color is different from the second color.

11. A provider computing system for multilingual data processing, the provider computing system comprising:

a network interface configured to facilitate data communication via a network; and a processing circuit comprising a processor and a memory, the processing circuit configured to:

receive, via the network interface, a digital file associated with a first piece of digital literature and a second piece of digital literature, wherein the digital file includes a first linguistic section in a first language associated with the first piece of digital literature and a second linguistic section in the first language associated with the second piece of digital literature, and wherein the digital file is a Research Information System (RIS) file;

translate the first linguistic section from the first language to a second language to determine a first translated linguistic section;

translate the second linguistic section from the first language to a second language to determine a second translated linguistic section;

determine one or more first key terms of the first translated linguistic section that relate to at least one classification using a large language model (LLM), wherein the one or more first key terms are in the second language;

determine one or more second key terms of the second translated linguistic section that relate to the at least one classification using the LLM, wherein the one or more second key terms are in the second language;

rank the first piece of digital literature based on the one or more first key terms, wherein the first piece of digital literature is ranked as a first rank;

rank the second piece of digital literature based on the one or more second key terms, wherein the second piece of digital literature is ranked as a second rank, and wherein the first rank is higher than the second rank;

determine, in response to the first rank being higher than the second rank, adverse event data based on the one or more first key terms;

generate a case dataset including at least a portion the adverse event data; and output, via the network interface, the case dataset.

12. The provider computing system of claim 11, wherein the processing circuit is further configured to:

receive, via the network interface, an intake threshold and at least one case intake preference including a requisite preference;

determine, the second translated linguistic section does not fulfill the intake threshold based on the requisite preference and the one or more second key terms; and determine, in response to the second translated linguistic section not fulfilling the intake threshold, the first translated linguistic section fulfills the intake threshold based on the requisite preference and the one or more first key terms.

13. The provider computing system of claim 12, wherein the requisite preference identifies at least one of: a seriousness, a medical product, or a study.

14. The provider computing system of claim 12, wherein the requisite preference identifies a seriousness, wherein the one or more first key terms identify a seriousness, and wherein to processing circuit determines the first translated linguistic section fulfills the intake threshold based on the requisite preference and the one or more first key terms by:

determining the seriousness of the requisite preference matches the seriousness of the one or more first key terms; and determining, in response to the second translated linguistic section not fulfilling the intake threshold, the first translated linguistic section fulfills the intake threshold based on the seriousness of the requisite preference matching the seriousness of the one or more first key terms.

15. The provider computing system of claim 14, wherein the at least one classification includes a first classification and a second classification, and wherein the processing circuit determines the one or more first key terms by:

classifying portions of the first translated linguistic section into at least one of: the first classification or the second classification;

retrieving first classification data associated with the first classification from a first repository of the provider computing system;

retrieving second classification data associated with the second classification from a second repository; and determining the one or more first key terms by using the LLM to match the portions of the first translated linguistic section with at least one of: the first classification data or the second classification data.

16. The provider computing system of claim 15, wherein the first classification is a medical product classification, wherein the first classification data is medical product data, wherein the second classification is an adverse event term classification, and wherein the second classification data is adverse event term data.

17. The provider computing system of claim 11, wherein the processing circuit is further configured to:

output, via the network interface, the first linguistic section of the digital file and the first translated linguistic section to a user computing device to enable display on a user interface, wherein the user interface includes an original linguistic section including the first linguistic section in the first language and a translated section including the first translated linguistic section in the second language.

18. The provider computing system of claim 17, wherein the one or more first key terms of the translated section are highlighted.

19. The provider computing system of claim 17, wherein the one or more first key terms include a third key term and a fourth key term, and wherein the processing circuit determines the one or more first key terms by:

classifying a first portion of the first translated linguistic section into a first classification;

retrieving first classification data associated with the first classification from a first repository of the provider computing system;

determining the third key term by matching the first portion of the first translated linguistic section with the first classification data;

classifying a second portion of the first translated linguistic section into a second classification;

retrieving second classification data associated with the second classification from a second repository; and determining the fourth key term by matching the second portion of the first translated linguistic section with the second classification data.

20. The provider computing system of claim 19, wherein the third key term of the translated section is highlighted in a first color associated with the first classification, and wherein the fourth key term of the translated section is highlighted in a second color associated with the second classification, wherein the first color is different from the second color.

* * * * *